(12) United States Patent
Iwaki et al.

(10) Patent No.: US 7,103,898 B2
(45) Date of Patent: Sep. 5, 2006

(54) METHOD FOR PRODUCING INNER SHELL FOR A DISC CARTRIDGE

(75) Inventors: Yuji Iwaki, Miyagi (JP); Shuichi Kikuchi, Miyagi (JP); Teiko Hoshi, Miyagi (JP); Naoki Inoue, Kanagawa (JP); Manabu Obata, Kanagawa (JP); Mitsuyoshi Kawaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 31 days.

(21) Appl. No.: 11/038,954

(22) Filed: Jan. 18, 2005

(65) Prior Publication Data

US 2005/0160447 A1    Jul. 21, 2005

Related U.S. Application Data

(62) Division of application No. 10/363,056, filed as application No. PCT/JP02/06290 on Jun. 24, 2002, now Pat. No. 7,017,170.

(30) Foreign Application Priority Data

| Jun. 29, 2001 | (JP) | ............................ P2001-198422 |
| Sep. 28, 2001 | (JP) | ............................ P2001-302500 |
| Sep. 28, 2001 | (JP) | ............................ P2001-303549 |

(51) Int. Cl.
*G11B 23/03* (2006.01)

(52) U.S. Cl. ....................... 720/728; 720/741
(58) Field of Classification Search ................. 720/741
See application file for complete search history.

(56) References Cited

U.S. PATENT DOCUMENTS 4,471,397 A    9/1984    Cloutier

| 4,738,613 A | 4/1988 | Eichlseder et al. |
| 5,161,081 A | 11/1992 | Machida et al. |
| 5,696,648 A | 12/1997 | Jeong et al. |

FOREIGN PATENT DOCUMENTS

| DE | 85 27 919 U1 | | 2/1989 |
| EP | 1 156 488 | | 11/2001 |
| JP | 58 141473 | | 8/1983 |
| JP | 05159518 A | * | 6/1993 |
| JP | 07235164 A | * | 9/1995 |
| JP | 10-21665 | | 1/1998 |
| JP | 11260019 A | * | 9/1999 |
| JP | 11273293 A | * | 10/1999 |
| JP | 2000-30396 | | 1/2000 |
| JP | 2000-113630 | | 4/2000 |

* cited by examiner

*Primary Examiner*—Brian E. Miller
(74) *Attorney, Agent, or Firm*—Frommer Lawrence & Haug LLP; William S. Frommer

(57) ABSTRACT

A method for producing an inner shell used for a disc cartridge in which an optical disc, an inner shell and shutter members are housed in a main cartridge body unit. The inner shell provided in the main cartridge body unit includes a first molded portion, provided with an aperture, a second molded portion having a resin injection port and molded at a position where the aperture is formed, and a flanged thin-walled section connecting the first and second molded portions to each other. The method includes the steps of injecting molten resin into a cavity defined by a fixed metal die and a movable metal die for molding the first molded portion, the second molded portion, and the flanged thin-walled section, and severing the flanged thin-walled section by a punch provided to the movable metal die before the molten resin injected into the cavity is cooled and solidified.

1 Claim, 24 Drawing Sheets

METHOD FOR PRODUCING INNER SHELL FOR A DISC CARTRIDGE

CROSS-REFERENCE TO RELATED APPLICATIONS

This application is a divisional application of U.S. Pat. No. 7,017,170 (U.S. application Ser. No. 10/363,056, filed Feb. 27, 2003), which is a §371 national stage application of PCT Application No. PCT/JP02/06290 (filed Jun. 24, 2002), which claims priority from Japanese Application No. 2001-198422 (filed Jun. 29, 2001), Japanese Application No. 2001-302500 (filed Sep. 28, 2001), and Japanese Application No. 2001-303549 (filed Sep. 28, 2001).

TECHNICAL FIELD

This invention relates to a disc cartridge, including a disc-shaped recording medium, such as an optical disc, a magneto-optical disc or a magnetic disc, housed for rotation within a main cartridge member, a molding member for molding a member which is to form this disc cartridge, and a method for producing an inner shell.

BACKGROUND ART

Up to now, a disc cartridge comprised of a disc-shaped recording medium, such as an optical disc, a magneto-optical disc or a magnetic disc, arranged for rotation within a main cartridge member, has been extensively used. This sort of the disc cartridge accommodates a disc-shaped recording medium, on which information signals, such as audio or video signal or program data have been already recorded or are to be recorded. The disc-shaped recording medium, on which the information signals can be recorded, may be enumerated by a write-once disc, which allows to record the information signals only once, and a rewritable optical disc, such as a magneto-optical disc, which allows for re-recording information signals.

As a disc cartridge, accommodating therein a disc-shaped recording medium on which information signals have been already recorded or are to be recorded, such a one shown in FIG. 1 is in use. A disc cartridge 500, shown in FIG. 1, accommodates an optical disc 502, which enables information signals to be recorded, and includes a main cartridge body unit 501, made up by an upper shell 501a and a lower shell 501b, and an optical disc 502 rotatably housed therein. The upper shell 501a and the lower shell 501b, making up the main cartridge body unit 501, are each formed with a recording and/or reproducing aperture 503 for exposing a portion of the optical disc 502 to outside. On the main cartridge body unit 501, there is movably mounted a shutter member 504 for opening/closing the aperture 503. Centrally of the optical disc 502 is mounted a chuck plate 505 for chucking on a turntable of a disc driving device, which is adapted for rotationally driving the optical disc 502.

When the disc cartridge 500 is mounted in a cartridge mounting position in the disc driving device, the shutter member 504 is slid to open the recording and/or reproducing aperture 503, while the optical disc 502 is loaded on the turntable. At this time, the chuck plate is attracted by a magnet provided on the turntable, so that the optical disc is now able to be rotated in unison with the turntable. If then a spindle motor is run in rotation, the optical disc 502 is rotated at a constant linear velocity. At this time, the shutter member 504 is moved, so that the optical head faces the optical disc 502 via the opened recording and/or reproducing aperture 503. As the optical head is moved radially of the optical disc 502, and a signal recording area of the optical disc 502 is scanned by a light beam radiated from the optical head, the information signals recorded on the optical disc 502 are read out by the light beam radiated from the optical head, or the information signals are recorded on the optical disc 502.

Meanwhile, in an optical disc, accommodated in a disc cartridge, the recording density tends to be increased, in keeping pace with the increasing recording capacity, such that the recording pattern tends to be narrowed in pitch, while tending to be higher in line density. If, with the optical disc in which the recording density is increased in keeping pace with the increasing recording capacity, dust and dirt of minute size become affixed to the signal recording surface, the light beam from the optical head is thereby interrupted to disable correct recording and/or reproduction of information signals.

With the above-described conventional disc cartridge 500, since the shutter member 504 of a substantially U-shaped cross-section is fitted on the outer side of the main cartridge body unit 501 so as to be movable relative to the main cartridge body unit 501, there is likely to be produced a gap intermediate the main cartridge body unit 501 and the shutter member 504, such that intrusion of dust and dirt cannot be prohibited satisfactorily. As a consequence, dust and dirt are intruded into the inside of the main cartridge body unit 501 so as to be deposited on the optical disc accommodated therein.

With this disc cartridge 500, in which the shutter member 504 is mounted outside the main cartridge body unit 501, there is a fear that the user inadvertently moves the shutter member 504 to open the recording and/or reproducing aperture 503. Since the shutter member 504 is linearly moved along a lateral side of the main cartridge body unit 501, the size ratio of the shutter member 504 relative to the main cartridge body unit 501 is increased, so that it is difficult to reduce the size of the shutter member 504 and of the main cartridge body unit 501.

DISCLOSURE OF THE INVENTION

It is therefore an object of the present invention to provide a novel disc cartridge not suffering from the above-described deficiency inherent in the conventional disc cartridge.

It is another object of the present invention to provide a disc cartridge having a superior effect in dust or dirt proofing effect which does not allow for intrusion of the dust or dirt of the minute size into the inside of the main cartridge body unit accommodating a disc-shaped recording medium.

It is a further object of the present invention to provide a disc cartridge in which reduction in size and thickness may be achieved despite the fact that an aperture having a large aperture ratio is provided in the main cartridge body unit and that a large sized shutter member is used for opening/closing the aperture.

It is a further object of the present invention to provide a disc cartridge in which, in recording and/or reproducing information signals on or from a disc-shaped recording medium, the recording and/or reproducing head may be approached to the disc-shaped recording medium accommodated within the main cartridge body unit, and in which, even when the recording and/or reproducing head is approached to the disc-shaped recording medium, the recording and/or reproducing head may be prohibited from interfering with the disc-shaped recording medium.

It is yet another object of the present invention to provide a molding member for a synthetic resin which allows for casting a disc cartridge, superior in the effect of preventing intrusion of dust and dirt eliminating into the main cartridge body unit, to high accuracy without molding distortion or warping.

The present invention provides a disc cartridge in which a disc-shaped recording medium, an inner shell, and a shutter member are mounted within a main cartridge body unit, obtained on combining an upper shell and a lower shell by having respective peripheral wall sections of the upper and lower shells abutted and combined to each other, and in which, by rotating the inner shell, the shutter member is movable between a first position and a second position, the first position being such a one that the shutter member closes an aperture provided in the main cartridge body unit for exposing at least a portion of the disc-shaped recording medium to outside along the radial direction of the disc-shaped recording medium, the second position being such a one that the aperture is opened. A crank-shaped dust intrusion prohibiting unit is provided inwardly of the peripheral wall sections of the upper and lower shells abutted to each other for preventing intrusion of dust from the abutting surfaces of the peripheral wall sections of the upper and lower shells towards the disc-shaped recording medium housed within the main cartridge body unit.

With the disc cartridge of the present invention, a disc-shaped recording medium, an inner shell, and a shutter member are mounted within a main cartridge body unit, obtained on combining an upper shell and a lower shell by having respective peripheral wall sections thereof abutted to each other, and in which, by rotating the inner shell, the shutter member is movable between a first position and a second position, with the first position being such a one that the shutter member closes an aperture provided in the main cartridge body unit for exposing at least a portion of the disc-shaped recording medium to outside along the radial direction of the disc-shaped recording medium, and with the second position being such a one that the aperture is opened. A crank-shaped dust intrusion prohibiting-unit for prohibiting intrusion towards the disc-shaped recording medium housed in the main cartridge body unit from the aperture is provided on a slide contact surface between at least one of the upper and lower shells and the shutter member.

With the disc cartridge of the present invention, since the shutter member is provided in the main cartridge body unit, the user may be prohibited from inadvertently sliding the shutter member. With the disc cartridge of the present invention, the crank-shaped dust intrusion prohibiting unit is provided for inhibiting intrusion of dust and dirt from the abutment surfaces of the peripheral wall sections of the upper and lower shells towards the disc-shaped recording medium, the crank-shaped dust intrusion prohibiting unit is provided on the slide contact surfaces of the shell and the shutter for prohibiting intrusion of dust and dirt from the aperture towards the disc-shaped recording medium, and further the indented dust intrusion prohibiting unit is provided for reliably prohibiting intrusion of dust and dirt into the main cartridge body unit to prevent micro-sized dust and dirt from being affixed to the disc-shaped recording medium accommodated in the main cartridge body unit to deteriorate recording and/or reproducing characteristics.

The present invention also provides a disc cartridge including a disc-shaped recording medium, a main cartridge body unit including an upper shell and a lower shell, the peripheral wall sections of which abut against each other, the main cartridge body unit accommodating the disc-shaped recording medium for rotation therein, at least a portion of the peripheral wall section of the lower shell being opened to form an open end, with an aperture being formed in the main cartridge body unit beginning from the open end for exposing a portion of the disc-shaped recording medium to outside across the inner and outer rims of the disc-shaped recording medium, an inner shell engaged in a guide groove formed between an outer peripheral wall section and an inner peripheral wall section of the upper shell so as to be supported for rotation therein, the inner shell including a connecting portion engaged in the guide groove, the inner shell also including an aperture in register with the aperture in the main cartridge body unit, and a shutter member movable by rotation of the inner shell between a position closing the aperture in the main cartridge body unit and a position opening the aperture in the main cartridge body unit. The connecting portion of the inner shell is set to a height such that the connecting portion is not protruded towards the lower shell relative to the lower surface of the disc-shaped recording medium.

With the present disc cartridge, the connecting portion of the inner shell is set to a height such that the connecting portion is not projected towards the lower shell relative to the lower surface of the disc-shaped recording medium, so that, as the head for recording and/or reproducing information signals for a disc-shaped recording medium is approached towards the disc-shaped recording medium, it may be satisfactorily introduced into the inside of the main cartridge body unit, through the aperture in the main cartridge body unit and the aperture in the inner shell, from outside the outer rim of the main cartridge body unit, thus enabling the disc cartridge to be reduced in thickness.

The present invention also provides a disc cartridge including a disc-shaped recording medium, a main cartridge body unit including an upper shell and a lower shell, the peripheral wall sections of which abut against each other, the main cartridge body unit accommodating the disc-shaped recording medium for rotation therein, at least a portion of the peripheral wall section of the lower shell being opened to form an open end, with an aperture being formed in the main cartridge body unit beginning from the open end for exposing a portion of the disc-shaped recording medium to outside across the inner and outer rims of the disc-shaped recording medium, an inner shell engaged in a guide groove formed between an outer peripheral wall section and an inner peripheral wall section of the upper shell so as to be supported for rotation therein, the inner shell including a connecting portion engaged in the guide groove, the inner shell also including an aperture in register with the aperture in the main cartridge body unit, and a shutter member movable by rotation of the inner shell between a position closing the aperture in the main cartridge body unit and a position opening the aperture in the main cartridge body unit. The inner shell is formed by a resin molding portion comprised of a first molded portion for forming the inner shell and a second molded portion formed as one with the first molded portion. The second molded portion is provided at a position forming the aperture in the inner shell, and is connected to the first molded portion through a flanged thin-walled section. The inner shell is formed on severing the second molded portion and the flanged thin-walled section.

The present invention also provides a molded member for a disc cartridge including a first molded portion, provided with a recording and/or reproducing aperture, and a second molded portion having a resin injection port and molded at a position where the aperture is formed. The first and second molded portions are formed as one with each other through a flanged thin-walled section. The first molded portion is an inner shell formed to approximately a disc shape and rotatably accommodated in a disc cartridge accommodating a disc-shaped recording medium therein. The inner shell is adapted for opening/closing a plate-shaped shutter member provided in the disc cartridge.

The present invention also provides a method for producing an inner shell used for a disc cartridge, the disc cartridge including a disc-shaped recording medium, a main cartridge body unit including an upper shell and a lower shell the peripheral wall sections of which abut against each other, the main cartridge body unit accommodating the disc-shaped recording medium for rotation therein, at least a portion of the peripheral wall section of the lower shell being opened to form an open end, with an aperture being formed in the main cartridge body unit beginning from the open end for exposing a portion of the disc-shaped recording medium to outside across the inner and outer rims of the disc-shaped recording medium, an inner shell engaged in a guide groove formed between an outer peripheral wall section and an inner peripheral wall section of the upper shell so as to be supported for rotation therein, the inner shell including a connecting portion engaged in the guide groove, the inner shell also including an aperture in register with the aperture in the main cartridge body unit, and a shutter member movable by rotation of the inner shell between a position closing the aperture in the main cartridge body unit and a position opening the aperture in the main cartridge body unit. The inner shell includes a first molded portion, provided with a recording and/or reproducing aperture, and a second molded portion having a resin injection port and molded at a position where the aperture is formed, and a flanged thin-walled section connecting the first and second molded portions as one to each other. The method includes the steps of injecting molten resin into a cavity defined by a fixed metal die and a movable metal die for molding the first molded portion, second molded portion and the flanged thin-walled section and severing the flanged thin-walled section by a punch provided to the movable metal die before the molten resin injected into the cavity is cooled and solidified.

Other objects, features and advantages of the present invention will become more apparent from reading the embodiments of the present invention as shown in the drawings.

BEST MODE FOR CARRYING OUT THE INVENTION

Figure 1:
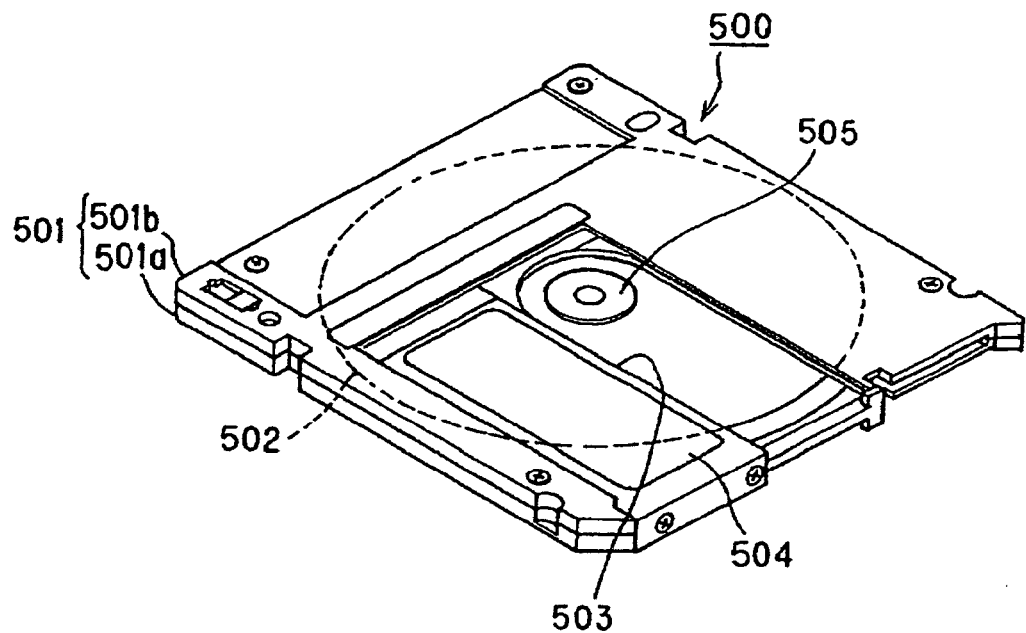
FIG. 1 is a perspective view showing an example of a conventional disc cartridge.

Referring to the drawings, a disc cartridge embodying the present invention will be explained in detail.

Referring to FIGS. 2 to 5, a disc cartridge 1 embodying the present invention includes an optical disc 3, as a disc-shaped recording medium, an inner shell 4, and a pair of shutter members 5a and 5b.

A main cartridge body unit 2 includes an upper shell 6 and a lower shell 7 combined with each other.

Figure 2:
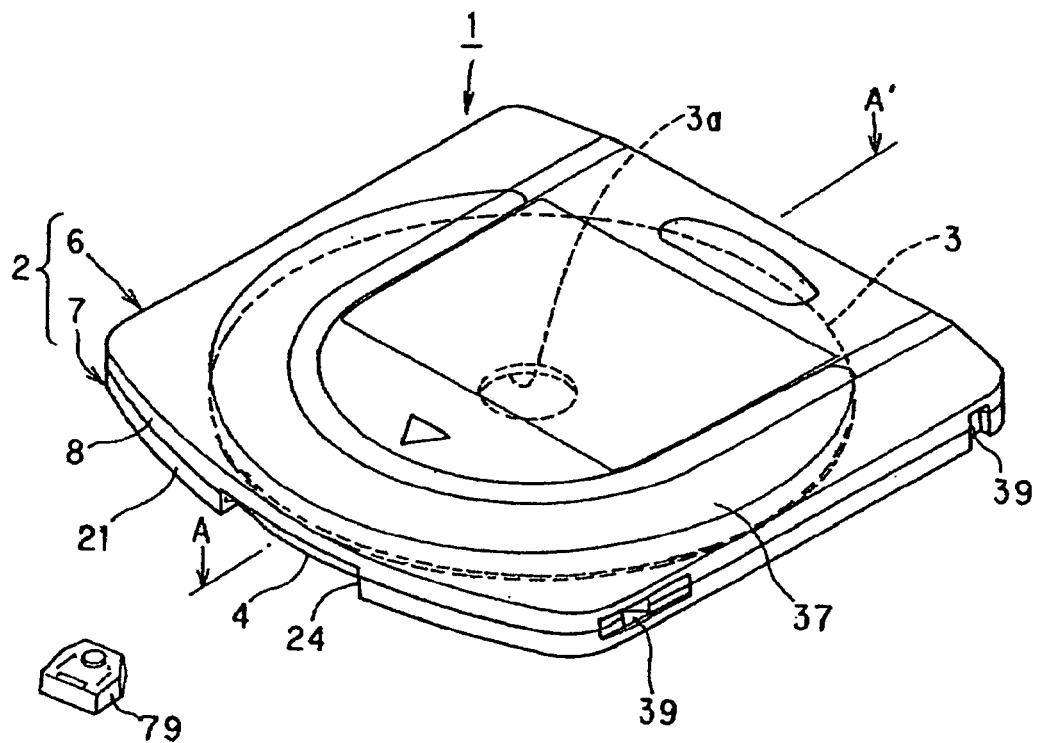
FIG. 2 is a perspective view showing a disc cartridge according to the present invention, looking from a side upper shell.
Figure 5:
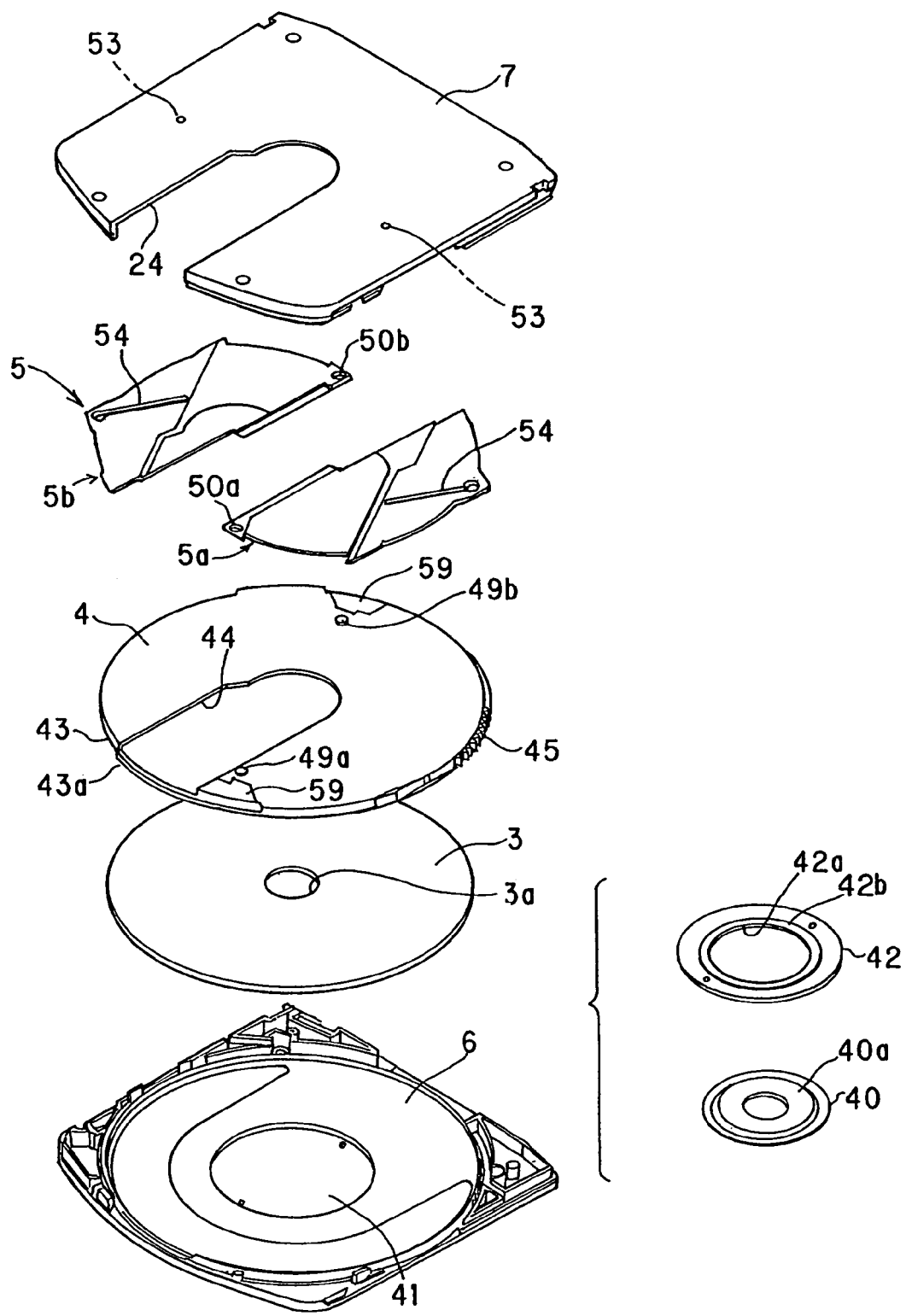
FIG. 5 is an exploded perspective view showing a disc cartridge according to the present invention, looking from the side lower shell.
Figure 6:
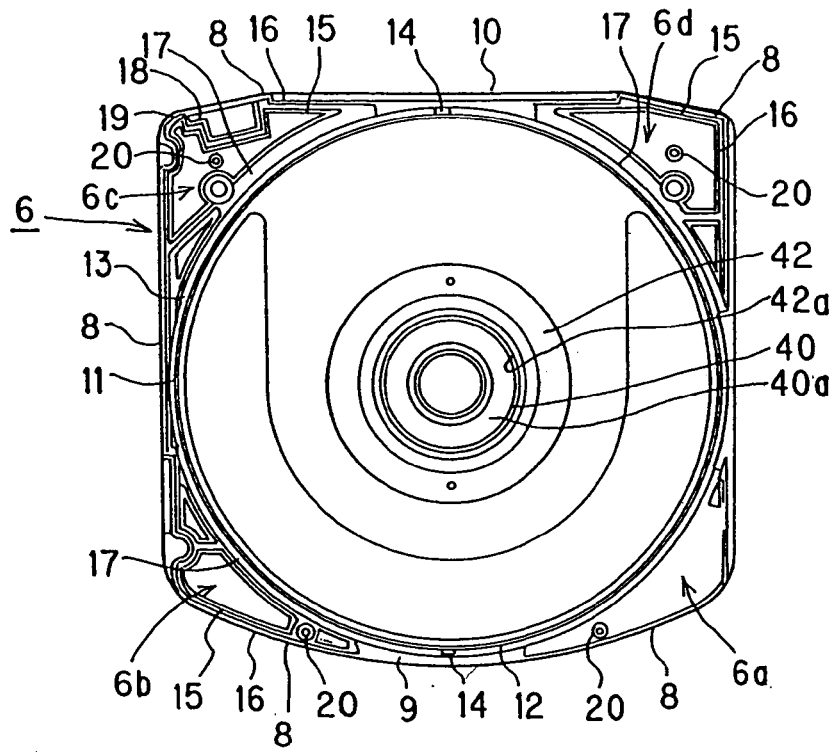
FIG. 6 is a plan view showing the side inner surface of an upper shell forming the disc cartridge according to the present invention and FIG. 7 is a plan view showing the side inner surface of a lower shell.

Referring to FIGS. 2, 5 and 6, the upper shell 6 is formed by injection molding a thermoplastic resin material, such as acrylonitrile butadiene styrene (ABS). The upper shell 6 has a substantially rectangular major surface, with its front side edge, adapted for being introduced into a disc driving device 70, as later explained, being shaped arcuately. The upper shell 6 includes an outer peripheral wall 8, as a sidewall of the main cartridge body unit 2, mounted upright along the outer periphery of the major surface. At a mid portion of the front surface of the outer peripheral wall 8 is formed a first pickup intrusion recess 9, into which an optical head 79 of the disc driving device 70 is to be intruded, as later explained. At a mid portion of the rear surface of the outer peripheral wall 8 is formed a positioning recess 10 for positioning the upper shell 6 relative to the lower shell 7. The recesses 9, 10 are each formed as a cut-out of a preset width. On the inner peripheral side of the outer peripheral wall 8 is set upright a substantially toroidally-shaped inner peripheral wall 11 forming a disc accommodating section. At a mid portion of the front side of the inner peripheral wall 11 is formed a second pickup intrusion recess 12, in which an optical head 79 of the disc driving device 70 as later explained is to be intruded. The second pickup intrusion recess 12 is similarly formed as a cut-out of a preset width.

On the outer peripheral side of the inner peripheral wall 11 is formed a substantially toroidally-shaped guide groove 13 for encircling the inner peripheral wall 11. In this guide groove 13 is rotatably engaged the inner shell 4. On the bottom surface of the guide groove 13 are protuberantly formed a pair of lift-up lugs 14 for moving the inner shell 4 in a direction away from the upper shell 6.

An upper corner peripheral wall 15 for preventing intrusion of dust and dirt is formed upright at three 6b, 6c and 6d of the four corners 6a, 6b, 6c and 6d, with the exclusion of the corner 6a on the front surface side forming a lock accommodating section. This upper corner peripheral wall 15 is formed for defining the periphery of the upper shell intermediate the outer peripheral wall 8 and the guide groove 13. A first groove 16 is formed intermediate the upper corner peripheral wall 15 and the outer peripheral wall 8, while a second groove 17 is formed intermediate the upper corner peripheral wall 15 and the guide groove 13.

An upper tab peripheral wall 18, forming a tab accommodating section, is mounted upright at the corner 6c on the back side opposite to the corner 6a of the front side of the upper shell 6. This upper tab peripheral wall 18 is formed intermediate the outer peripheral wall 8 and the upper corner peripheral wall 15 for surrounding the corner 6c on the back side together with the outer peripheral wall 8. A third groove 19 is formed intermediate the upper tab peripheral wall 18 and the upper corner peripheral wall 15.

In the vicinity of the corners 6a to 6d of the upper shell 6, there is protuberantly formed a substantially columnar-shaped positioning pin 20, at a mid portion of which is formed a tapped hole.

Figure 3:
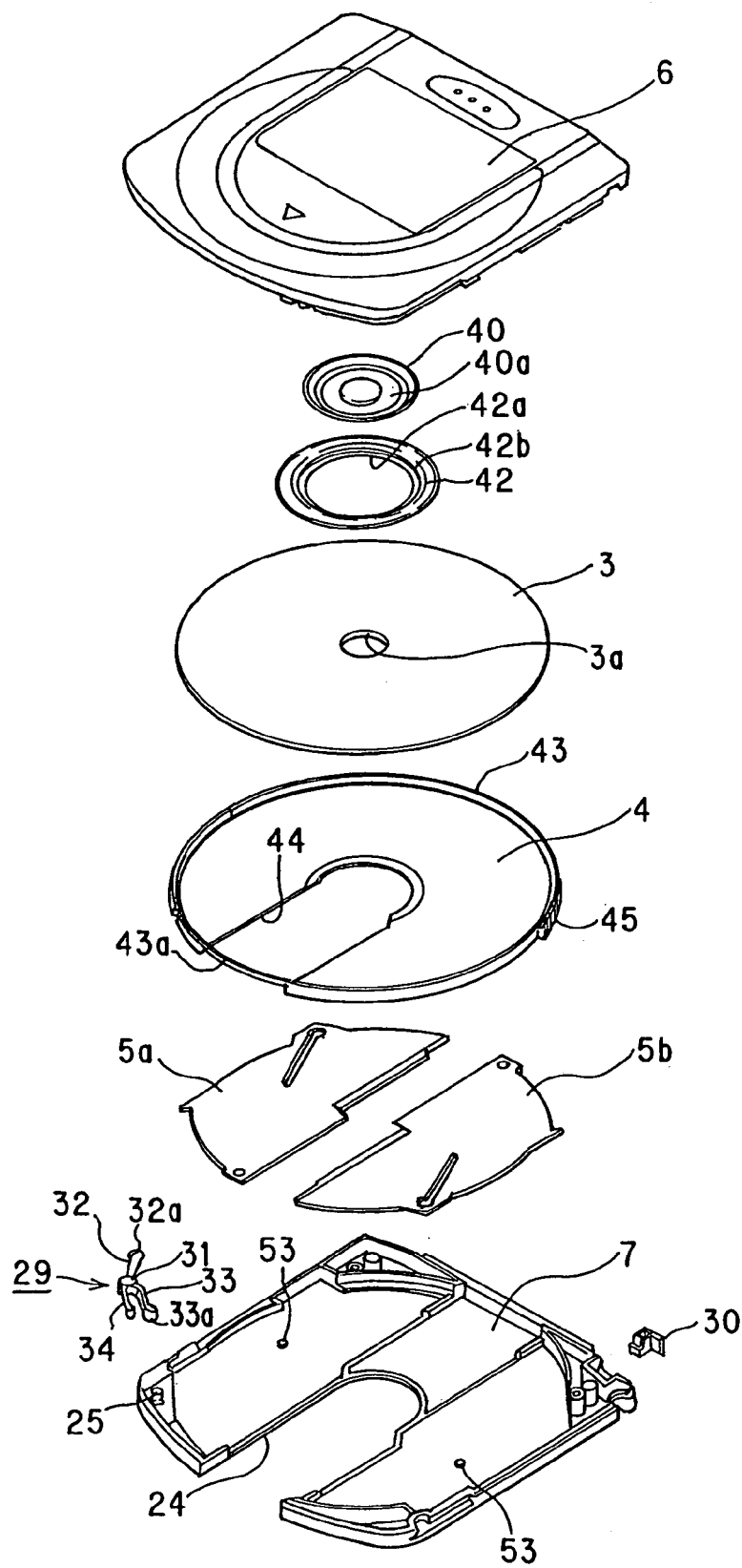
FIG. 3 is an exploded perspective view of the disc cartridge according to the present invention, looking from the side upper shell.
Figure 4:
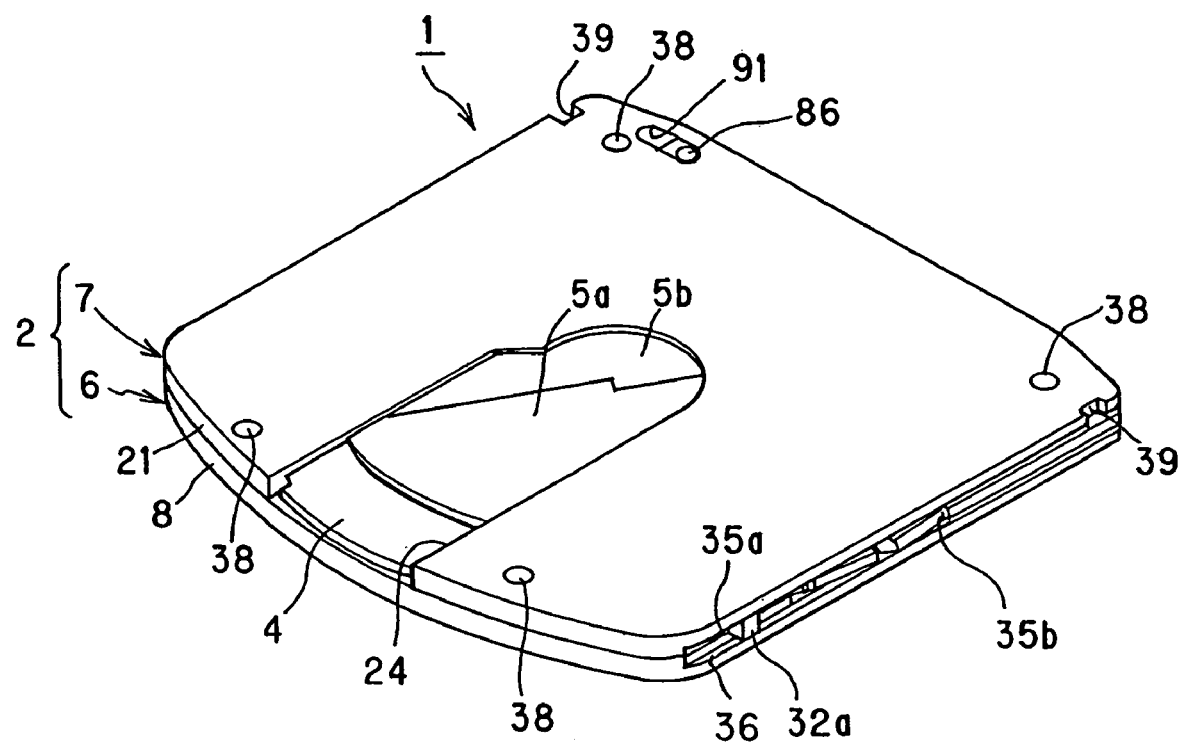
FIG. 4 is a perspective view showing a disc cartridge according to the present invention, looking from the side lower shell.
Figure 7:
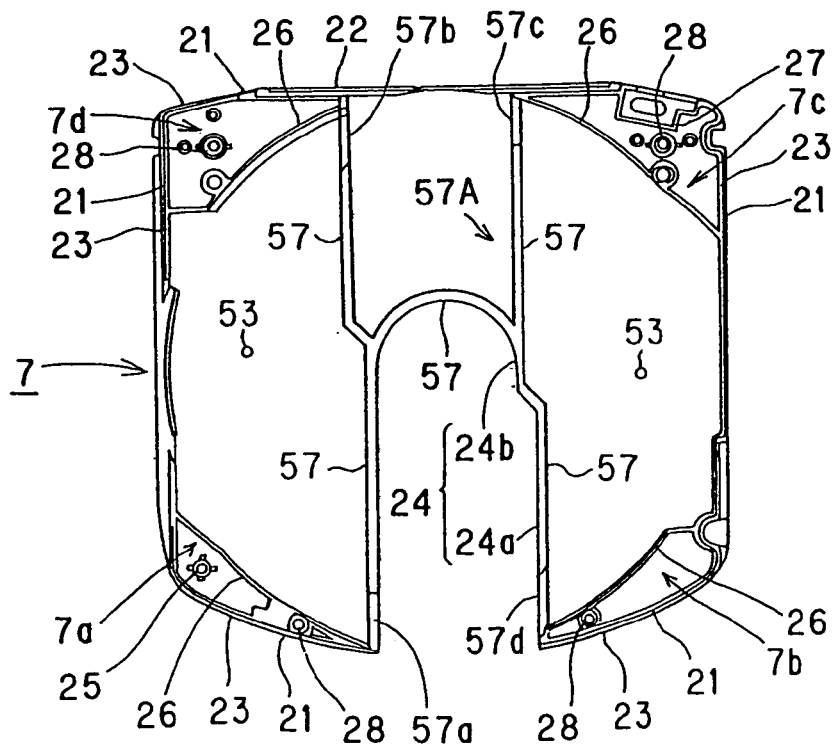

Referring to FIGS. 3, 4 and 7, the lower shell 7 is formed by injection molding a thermoplastic resin, such as acrylonitrile butadiene styrene (ABS), as is the upper shell 6. The lower shell 7 has a substantially rectangular major surface, with its front side edge, adapted for being introduced into the disc driving device, as later explained, being shaped arcuately. The lower shell 7 includes an outer peripheral wall 21, mounted upright along the outer periphery of the major surface for serving as a sidewall of the main cartridge body unit.

To the distal end of the outer peripheral wall 21, there are mounted upright a positioning peripheral wall 22, engaged in the positioning recess 10 formed in the upper shell 6 for positioning the upper shell 6 and the lower shell 7, and a dust-proofing peripheral wall 23 engaged in the first groove 16 in the upper shell 6 for preventing dust from being intruded from the space between the upper and lower shells 6, 7. That is, the positioning peripheral wall 22 on the upper shell 6 and the dust-proofing peripheral wall 23 on the lower shell 7 are abutted to and combined with each other to make up a cranked first dust intrusion prohibiting section 21A for preventing dust and dirt from being intruded from the outside into the inside of the main cartridge body unit 2 accommodating the optical disc 3.

The lower shell 7 includes a substantially rectangular-shaped aperture portion 24a, formed by opening the front mid portion of the outer peripheral wall 21 to a predetermined width for exposing a portion of the optical disc 3 to outside across the inner and outer rims of the disc, and a substantially circular aperture portion 24b for exposing a center opening 3a of the optical disc 3 to outside. Specifically, this lower shell 7 includes the recording and/or reproducing aperture portion 24a dimensioned to be large enough to permit the optical head of the disc driving device, as later explained, to be intruded into the inside of the main cartridge body unit 2, and the driving aperture portion 24b dimensioned to be large enough to permit a turntable 78 of the disc driving device 70 as later explained to be intruded into the inside of the main cartridge body unit 2, with the aperture portions 24a, 24b together defining a sole aperture 24 opened to a mid portion of the front side of the outer peripheral wall 21. Meanwhile, the first and second pickup intrusion recesses 9, 12 of the upper shell 6 are of a width substantially coincident with the width of the aperture 24.

At the corner 7a, from among the corners 7a to 7d of the lower shell 7, on the front side of the lower shell 7, forming a lock accommodating section, there is protuberantly formed a supporting shaft 25 for rotatably supporting a lock member 29, which will be explained subsequently. At the remaining three corners 7b to 7d, excluding the corner 7a, of the front side of the lower shell 7, there is formed upright a substantially arcuate lower corner peripheral wall 26 engaged in the second groove 17 of the upper shell 6 described above. On the rear side corner 7c, opposite to the front side corner 7a, of the lower shell 7, there is formed upright a lower tab peripheral Wall 27 engaged in a third groove 19 of the upper shell 6 described above. The lower shell 7 is formed with a substantially cylindrically-shaped positioning cap 28 engaged with the positioning pin 20 of the upper shell 6. A through-hole, not shown, is bored through the bottom of the positioning cap 28.

The main cartridge body unit 2 is formed by superposing the upper and lower shells 6, 7 as the respective peripheral wall sections 8, 21 are abutted against each other.

At this time, the positioning recess 10 of the upper shell 6 is engaged with the positioning peripheral wall 22 of the lower shell 7. On the other hand, the positioning pin 20 of the upper shell 6 and the positioning cap 28 of the lower shell 7 are engaged with each other. A set screw, not shown, is threaded into the tapped hole in the positioning pin 20 through the through-hole of the positioning cap 28. In the first groove 16, second groove 17 and the third groove 19 of the upper shell 6, the dust-proofing peripheral wall 23, lower corner peripheral wall 26 and the lower tab peripheral wall 27 on the lower shell 7 are engaged, respectively.

Figure 8:
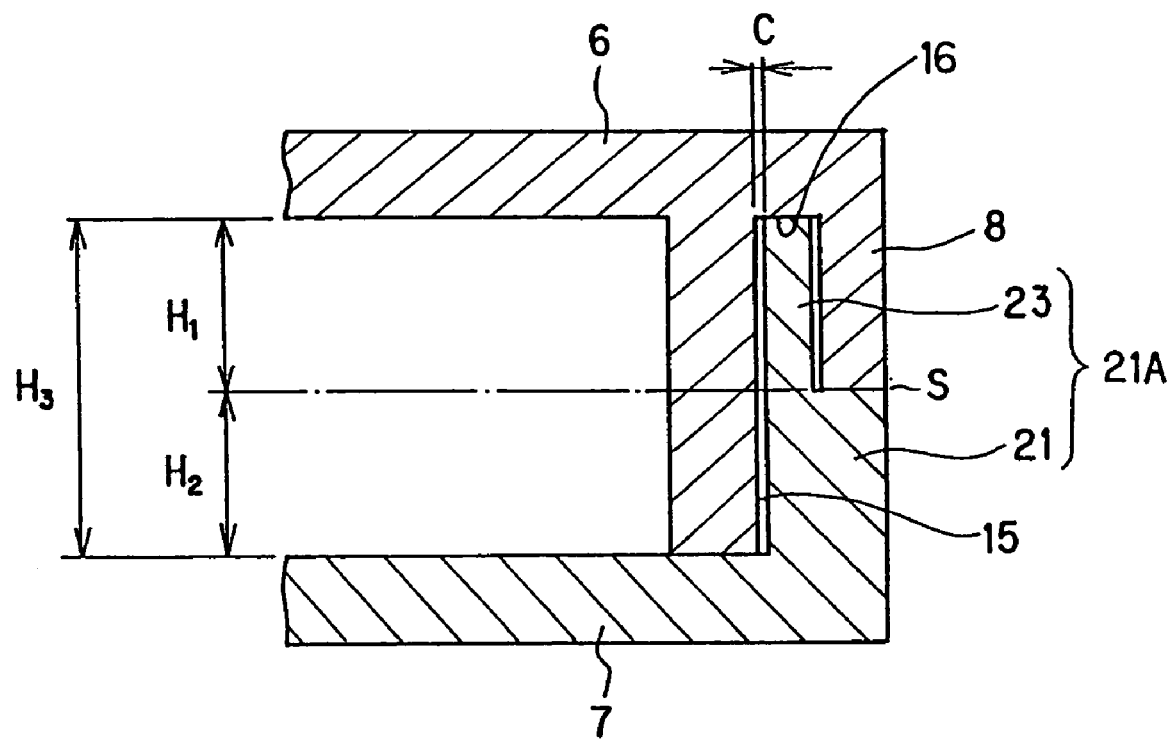
FIG. 8 is an enlarged cross-sectional view showing junction portions of the upper and lower shells making up the disc cartridge according to the present invention.

If, as shown in FIG. 8, the height of the outer peripheral wall 8 of the upper shell 6 is H1, the height of the outer peripheral wall 21 of the lower shell 7 is H2 and the inner height of the main cartridge body unit 2 is H3, with H3=H1+H2, the upper corner peripheral wall 15, lower corner peripheral wall 26, upper-tab peripheral wall 18 and the lower tab peripheral wall 27 are each of a height H3. The dust-proofing peripheral wall 23 is of a height H1, with an inner rim side clearance C between the dust-proofing peripheral wall 23 and the first groove 16 being not less than 0.1 mm and not larger than 0.5 mm. This enables intrusion of dust and dirt to be prevented without detracting from the ease with which the upper and lower shells 6, 7 are put together.

Thus, with the main cartridge body unit 2, since an abutment surface S between the positioning peripheral wall 22 of the upper shell 6 and the dust-proofing peripheral wall 23 of the lower shell 7, abutted and combined to each other to form the first dust intrusion prohibiting section 21A, is crank-shaped, it is possible to prevent dust and dirt from being intruded into the inside of the main cartridge body unit 2 from a space between the outer peripheral wall 8 of the upper shell 6 and the outer peripheral wall 21 of the lower shell 7.

Referring to FIGS. 3 to 5, the upper and lower shells 6, 7 are superposed one on the other to form a disc housing section in a mid portion of the main cartridge body unit 2 for rotatably accommodating the optical disc 3, while a lock housing section for rotatably accommodating the lock member 29 is formed at one front side corner and a tab housing section for slidably accommodating a tab member 30 is formed at one rear side corner.

The lock member 29 performs the role of restraining the rotation of the inner shell 4 when the inner shell 4 is at a position of closing the aperture 24 of the main cartridge body unit 2. This lock member 29 includes an engagement opening 31, rotationally engaged with the supporting shaft 25 of the lower shell 7, an operating piece 32 extended from the engagement opening 31 towards one lateral side of the main cartridge body unit 2, a stopper piece 33 extending from the engagement opening 31 towards the disc housing section, and a spring piece 34 extended from this engagement opening 31 towards the inner lateral surface on the front side of the main cartridge body unit 2. The distal end of the operating piece 32 includes an operating lug 32*a* exposed to outside from a lock opening 35*a* formed in a lateral surface of the main cartridge body unit 2. The distal end of the stopper piece 33 includes a stopper boss 33*a* which is in sliding contact with a ring 43 of the inner shell 4, as later explained. The spring piece 34 is abutted in an elastically deflected state against the front inner surface of the main cartridge body unit 2.

Consequently, the lock member 29 is biased, under the force of the spring piece 34, in a direction in which the operating lug 32*a* of the operating piece 32 is protruded via the lock opening 35*a*, and in a direction in which the stopper boss 33*a* of the stopper piece 33 is abutted against the ring 43 of the inner shell 4. This lock member 29 is swung, by the operating lug 32*a* of the operating piece 32 being thrust, such that the stopper piece 33 is moved in a direction away from the ring 43 provided on the outer periphery of the inner shell 4.

The tab member 30 performs the role of preventing inadvertent erasure of information signals recorded on the optical disc 3. Specifically, this tab member 30 includes a an operating lug, exposed to outside via a tab opening formed in a lateral surface on the back side of the main cartridge body unit 2, and a switching lug engaged in a pair of switching recesses formed in an upper tab peripheral wall. The tab member 30 is slid by the operating lug being acted on so that the switching lug is engaged with one of the paired switching recesses to effect switching as to whether or not the information signals can be recorded on the optical disc 3.

On a lateral surface of the main cartridge body unit 2 is formed a guide groove 36 for extending in the fore-and-aft direction. The guide groove 36 is aimed to prevent mistaken insertion of the disc cartridge 1 at the time of loading thereof on the disc driving device 70 which will be explained subsequently. On the bottom surface of the guide groove 36 are sequentially formed, looking from the side front surface, the lock opening 35*a*, through which the operating lug 32*a* of the lock member 29 is exposed to outside, and an opening for a rotor 35*b*, through which the outer periphery of the inner shell 4 is partially exposed to outside.

In the upper surface of the main cartridge body unit 2 is formed a see-through window 37 through which the optical disc 3 housed therein may be viewed. In the lower surface of the main cartridge body unit 2 are formed a plurality of positioning recesses 38 for effecting positioning at the time of loading the main cartridge body unit 2 on the disc driving device 70 which will be explained subsequently. In both lateral sides of the main cartridge body unit 2 are formed plural cut-outs 39 for positioning at the time of loading the disc cartridge 1 on the disc driving device 70 and for discriminating the disc cartridge type.

The optical disc 3 is substantially in the form of a disc having the center opening 3*a*, and is housed for rotation in the inside of the above-described main cartridge body unit 2, as shown in FIGS. 3 and 5. The center portion of the optical disc 3 is pressed by a chuck plate 40 when the optical disc is chucked on the turntable 78 of the disc driving device 70 as later explained. This chuck plate 40 is substantially disc-shaped and is formed of a metallic material attractable by a magnet. The chuck plate 40 has its mid portion swollen to form a disc thrusting portion 40*a* adapted for thrusting the center portion of the optical disc 3.

A plate housing recess 41, adapted for rotatably holding the chuck plate 40, is formed centrally of the upper shell 6. In the plate housing recess 41 is fitted a plate retainer 42 for holding the chuck plate 40 therein. The plate retainer 42 is provided with a fitting opening 42*a*, in which is fitted a thrusting portion 40*a*. The plate retainer is also provided with an engagement recess 42*b*, engaged by the outer periphery of the chuck plate 40, such as to surround the fitting opening 42*a*.

Figure 9:
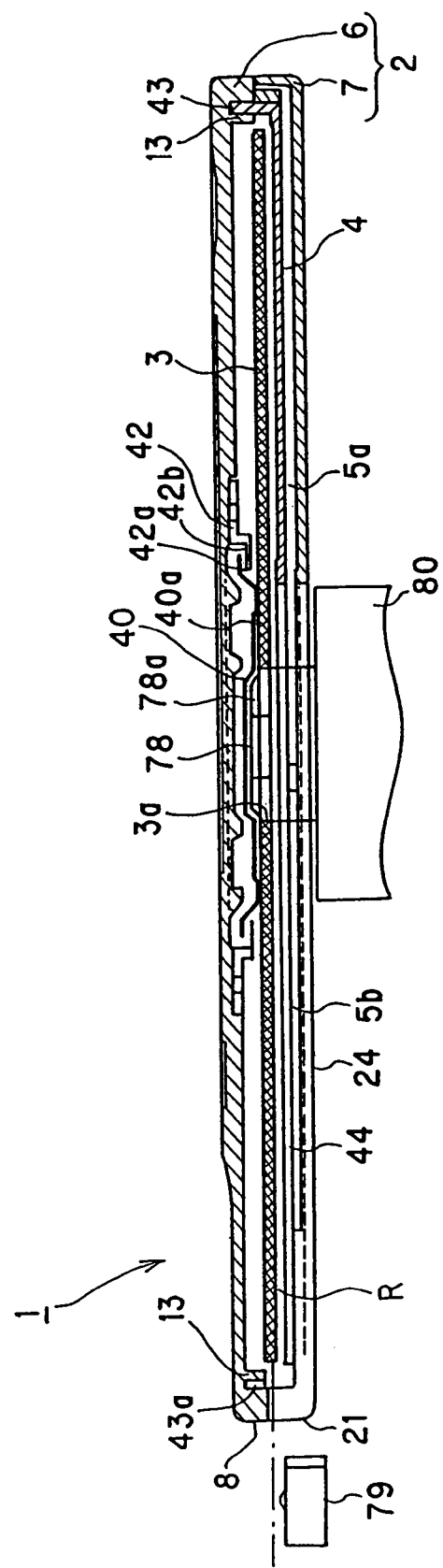
FIG. 9 is a cross-sectional view taken along line A–A' in FIG. 2.

Thus, the chuck plate 40 is rotatably accommodated in the inner space defined by the plate housing recess 41 and the plate retainer 42, as the disc thrusting portion 40a is protruded via the fitting opening 42a of the plate retainer 42, as shown in FIG. 9.

The optical disc 3, accommodated in the main cartridge body unit 2, may be enumerated by a replay-only optical disc, having pre-recorded thereon audio data corresponding to audio content data, or video data corresponding to video content data, a write-once optical disc, capable of writing the information signals only once and a rewritable optical disc capable of repeatedly rewriting the information signals. The disc-shaped recording medium may be enumerated by a magneto-optical disc or a magnetic disc, in addition to the aforementioned optical disc 3.

The inner shell 4, equivalent to an intermediate shell, arranged within the main cartridge body unit 2, is formed by injection molding a thermoplastic resin material, such a polyoxymethylene (POM), as shown in FIGS. 3 and 5. The inner shell 4 is substantially disc-shaped and includes a substantially toroidally-shaped ring 43 engaged in the guide groove 13 of the upper shell 6. The inner shell 4 is rotatably supported with respect to the main cartridge body unit 2 by the ring 43 engaging in the guide groove 13 of the upper shell 6. The inner shell 4 also includes an aperture 44 corresponding to the recording and/or reproducing aperture 24 formed in the lower shell 7. The portion of the ring 43 on the outer periphery of the inner shell 4, lying at the open end of the aperture 44, operates as a connecting portion 43a for bridging the open end side of the aperture 44.

On the outer peripheral surface of the ring 43 is formed a gear 45 for rotating the inner shell 4. This gear 45 is formed between a position opened to outside from the front surface side of the opening for the rotor 35b, with the inner shell 4 then being in the closed position shown in FIG. 10, and a position opened to outside from the side back surface of the opening for the rotor 35b, with the inner shell 4 then being in the open position shown in FIG. 11.

On the outer peripheral surface of the ring 43 are formed a pair of stopper projections 46a, 46b, at a preset spacing from each other, for controlling the amount of rotation of the inner shell 4. The upper shell 6 is provided with a pair of stopper receiving portions 47a, 47b, between the guide groove 13 and the upper corner peripheral wall 15, so as to be abutted by the stopper projections 46a, 46b, respectively. When the inner shell 4 is rotated clockwise in FIG. 1, the stopper projection 46a abuts on the stopper receiving portion 47a to impede further rotation of the inner shell 4. At this time, the inner shell 4 is in its opened position, with the aperture 44 of the inner shell 4 being substantially coincident with the aperture 24 of the main cartridge body unit 2. On the other hand, when the inner shell 4 is rotated counterclockwise in FIG. 10, the stopper projection 46b abuts on the stopper receiving portion 47b to impede further rotation of the inner shell 4. At this time, the inner shell 4 is in its closed position, with the aperture 44 of the inner shell 4 being tilted to the maximum extent with respect to the aperture 24 of the main cartridge body unit 2.

Figure 10:
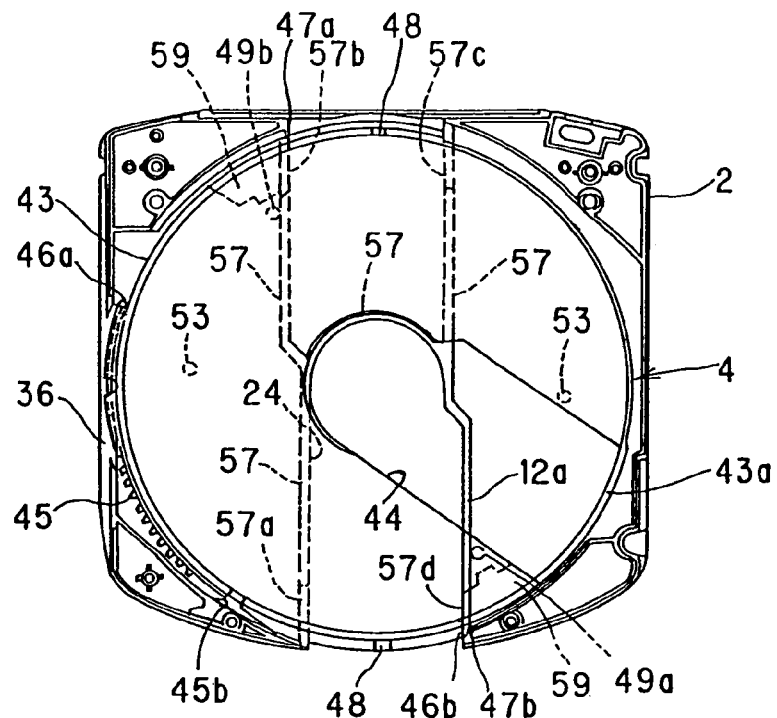
FIG. 10 is a see-through plan view showing an open position of an inner shell relative to the main cartridge body unit in the disc cartridge of the present invention.
Figure 11:
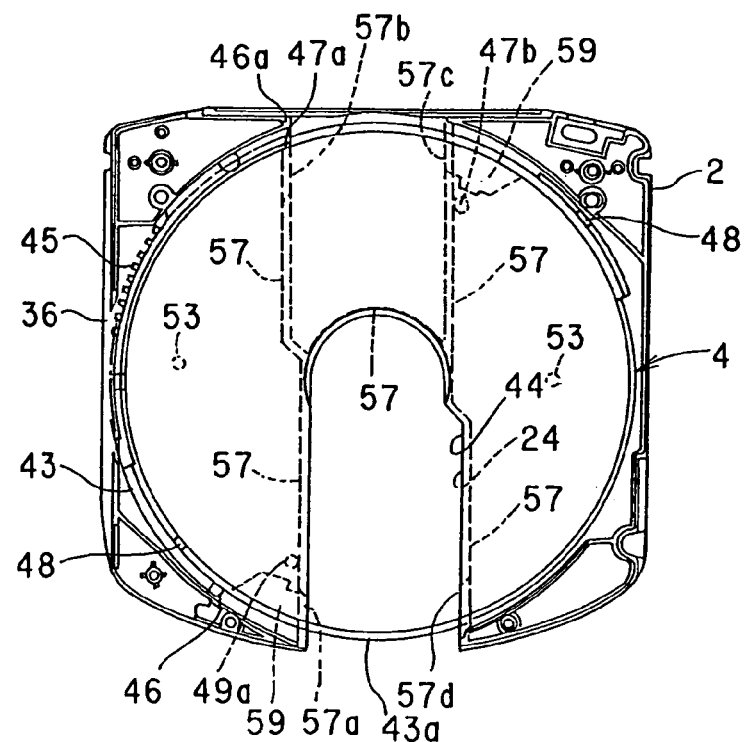
FIG. 11 is a see-through plan view showing a closure position of an inner shell relative to the main cartridge body unit in the disc cartridge of the present invention.

On the foremost end face of the ring 43 are protuberantly formed a pair of lift-up lugs 48 adapted for having sliding contact with a pair of lift-up lugs 14 of the guide groove 13, as shown in FIGS. 10 and 11. When the inner shell 4 is in proximity to the closure position, the lift-up lugs 48 ride on the lift-up lugs 14 of the guide groove 13, as the lift-up lugs 48 are in sliding contact therewith, such that the inner shell 4 is lifted in a direction away from the upper shell 6.

On the major surface of the inner shell 4 opposite to its surface from which projects the ring 43 are formed a pair of supporting shafts 49a, 49b, adapted for rotationally supporting a pair of shutter members 5a, 5b, respectively, as shown in FIG. 5. These supporting shafts are provided at point-symmetrical positions with respect to the center of the inner shell 4, that is with a phase difference of 180° to each other.

Figure 12:
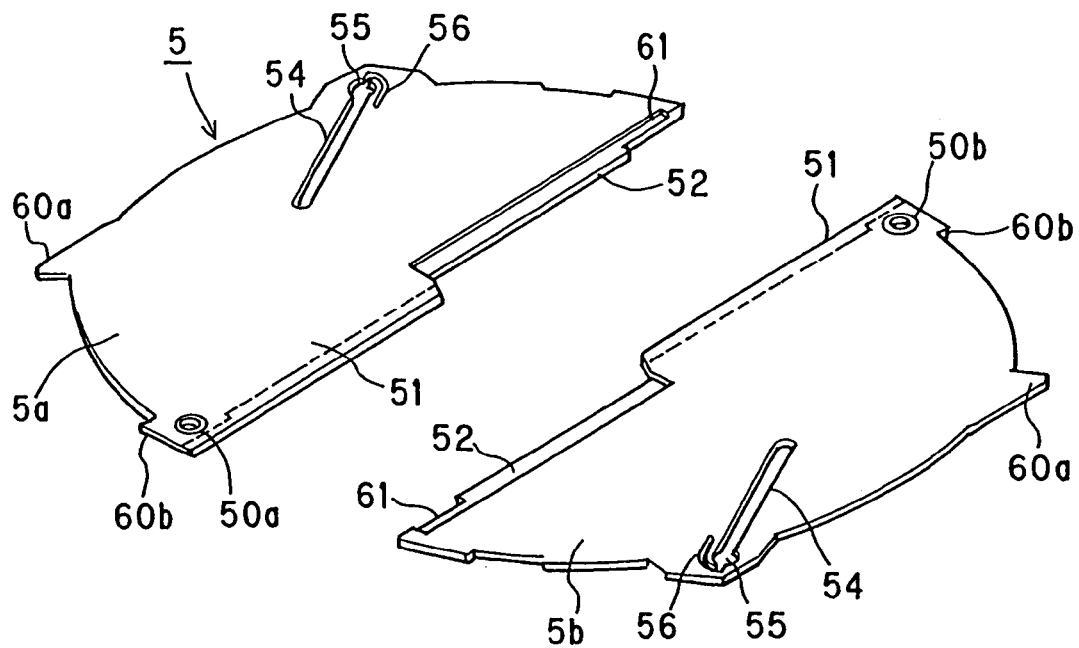
FIG. 12 is a perspective view showing the shutter member forming the disc cartridge according to the present invention for the side upper shell and FIG. 13 is a perspective view showing the shutter member forming the disc cartridge according to the present invention.
Figure 13:
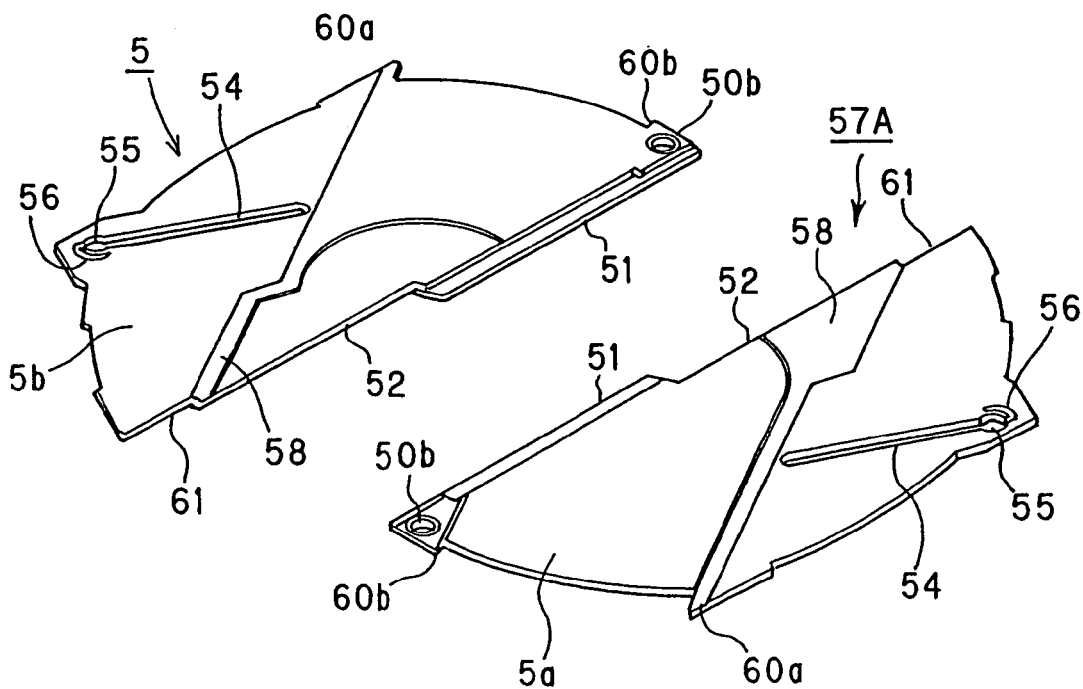

The paired shutter members 5a, 5b are shaped point-symmetrically relative to each other and are rotatably mounted with a phase difference of 180° about the paired supporting shafts 49a, 49b of the inner shell 4, as the center of rotation, as shown in FIGS. 12 and 13. The equivalent parts or components of the paired shutter members 5a, 5b are denoted by the same reference numerals. Similarly to the inner shell 4, the shutter members 5a, 5b are formed by injection molding a thermoplastic resin material, such as polyoxymethylene (POM). The shutter members 5a, 5b are each in the form of substantially semi-circular flat plate. The proximal ends of the shutter members 5a, 5b are formed with engagement openings 50a, 50b engaged by the rotatable supporting shafts 49a, 49b of the inner shell 4.

Figure 14:
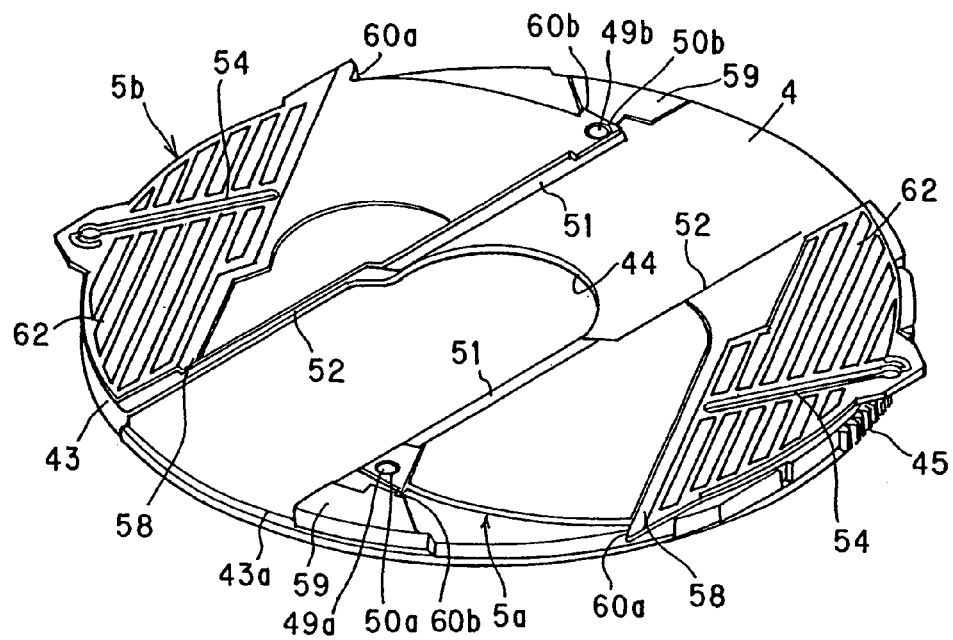
FIG. 14 is a perspective view showing the open position of the shutter member relative to the inner shell and FIG. 15 is a perspective view showing the open position of the shutter member relative to the inner shell, in the disc cartridge according to the present invention.
Figure 15:
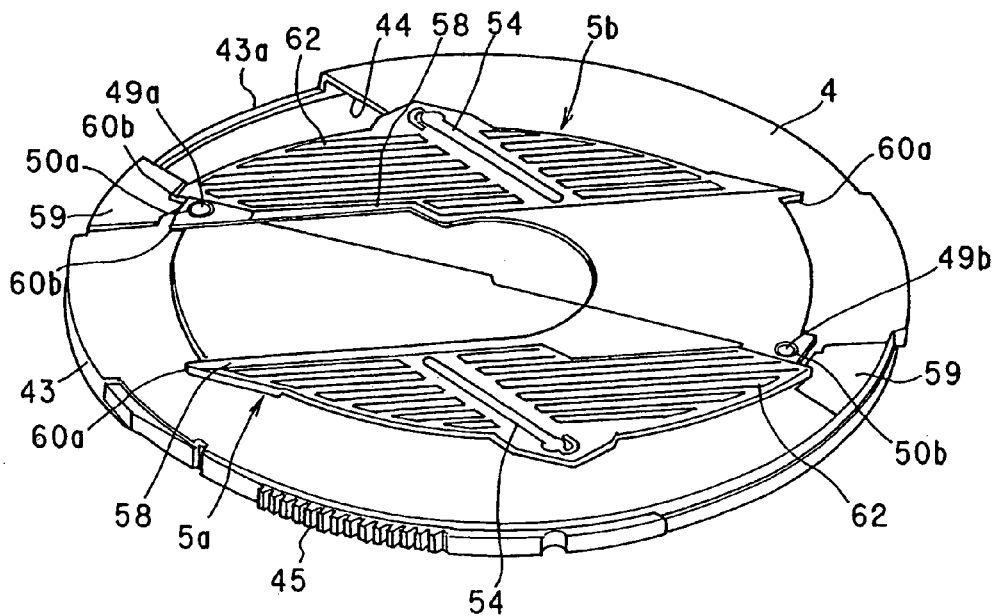

On chord portions of the paired shutter members 5a, 5b, acting as the abutment surfaces thereof, there are formed a first abutment surface section 51, extending from the center portion towards the proximal end, and a second abutment surface section 52, extending from the center portion towards the distal end. Of these abutment surface sections, the first abutment surface section 51 has its side towards the lower shell 7 formed as an inclined surface, while the second abutment surface section 52 has its side towards the upper shell 6 formed as an inclined surface. The shutter members 5a, 5b are rotated in a direction towards and away from each other, about the supporting shafts 49a, 49b of the inner shell 4 as the center of rotation, such that the first abutment surface section 51 of the shutter member 5a is engaged with the second abutment surface section 52 of the shutter member 5b, while the first abutment surface section 51 of the other shutter member 5b is engaged with the second abutment surface section 52 of the shutter member 5a, as shown in FIGS. 14 and 15.

The shutter members 5a, 5b are each formed with an elongated opening 54, engaged by one of a pair of guide pins 53, protuberantly formed on the inner surface of the lower shell 7, as shown in FIG. 7. These elongated openings 54 are formed to a preset length from a mid portion of the chord towards the engagement openings 50a, 50b so that the shutter members 5a, 5b will be rotated between the closure position and the opened position. The end of the elongated opening 54 towards the outer rim is provided with an engagement portion 55 engaged by the guide pin 53 of the lower shell 7 and with an elastic piece 56af; thrusting the guide pin 53 engaged with the engagement portion 55.

Figure 16:
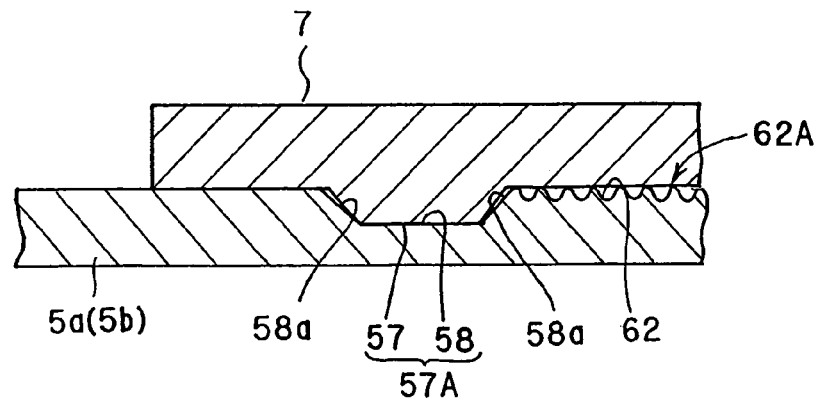
FIG. 16 is an enlarged cross-sectional view showing engaged portions of the inner shell and the shutter member.

The disc cartridge 1 is provided with a second dust intrusion prohibiting section 57A for preventing the dust and dirt from being intruded through a space between the aperture 24 of the main cartridge body unit 2 and the paired shutter members 5a, 5b. The second dust intrusion prohibiting section 57A is provided between the lower shell 7 and the shutter members 5a, 5b, as shown in FIG. 16. The second dust intrusion prohibiting section 57A is made up by a rib-like projection 57 provided on the lower shell 7 for surrounding the aperture 24, as shown in FIG. 7, and by a groove-like recess 58 engaged by the rib-like projection 57 provided on the shutter members 5a, 5b, as shown in FIG. 13. The rib-like projection 57, forming the second dust intrusion prohibiting section 57A, is protuberantly formed in the form of a substantially planar H-shape so that the aperture 24 will be encircled by the inner surface of the inner shell 4. The portions of the rib-like projection 57, connecting to the outer peripheral wall 21 of the front side and the back side, are formed as raised portions 57a, 57b, 57c and 57d of an increased height. Meanwhile, the rib-like projection 57 is of a height of the order of 0.5 mm, with the height of the four raised portions 57a to 57d being approximately several times as large as the rib-like projection 57.

On the other hand, the groove-like recess 58 is formed in the major surface of the lower shell 7 of each of the shutter members 5a, 5b to a size and depth corresponding to those of the rib-like projection 57. This groove-like recess 58 is engaged by the rib-like projection 57, when the shutter members 5a, 5b are in the closure position, as shown in FIG. 16. The width-wise ends of the rib-like projection 57 and the groove-like recess 58 are formed as inclined surfaces 58a, 58b, as shown in FIG. 16, so that, when the shutter members 5a, 5b are moved from the first position of closing the aperture 24 to the second position of opening the aperture 24, the rib-like projection 57 can be easily disengaged from the groove-like recess 58.

Meanwhile, with the second dust intrusion prohibiting section 57A, when the rib-like projection 57 is engaged with the groove-like recess 58, the abutment surface between the groove-like recess 58 and the rib-like projection 57 is cranked in shape for assuring positive closure of the space between the lower shell 7 and the shutter members 5a, 5b for positively preventing dust and dirt from intruding into the inside of the main cartridge body unit 2.

The inner shell 4 is formed with protuberant substantially trapezoidally-shaped disengaging protrusions 59, in the vicinity of the paired supporting shafts 49a, 49b, as shown in FIGS. 5, 10 and 11. These disengaging protrusions 59 are of approximately the same height as the rib-like projection 57 and operate for disengaging the rib-like projection 57 from the groove-like recess 58 when the shutter members 5a, 5b are moved from the closure position to the opened position.

It is noted that the width-wise ends of the rib-like projection 57 and the groove-like recess 58, engaged with each other, are formed as inclined surfaces, as shown in FIG. 15, to assure facilitated disengagement of the rib-like projection 57 from the groove-like recess 58 when the shutter members 5a, 5b are moved from the closure position to the opened position.

The shutter members 5a, 5b are each formed with a protuberant first closure piece 60a, abutted by the raised portions 57a, 57c of the rib-like projection 57, while being each formed with a protuberant second closure piece 60b, abutted by the raised portions 57b, 57d thereof, as shown in FIGS. 12 and 13. The shutter members 5a, 5b are also each formed with a cut-out 61 at the distal end of the second abutment surface section 52 for allowing for entrance of the raised portions 57b, 57d of the rib-like projection 57. The major surface of each of the shutter members 5a, 5b towards the lower shell 7 is formed with an indented labyrinthine pattern 62, as shown in FIGS. 14 to 16. This indented labyrinthine patterns 62, comprised of plural parallel alternate recesses and lands, is formed inwards on the shutter members 5a, 5b to form a third dust intrusion prohibiting section 62A. That is, when the shutter members 5a, 5b are superposed on the lower shell 7, the indented labyrinthine pattern 62 forms a space between the lower shell 7 and the shutter members 5a, 5b into which intrusion of dust and dirt is allowed to prevent intrusion of dust and dirt into the inside of the main cartridge body unit 2. Meanwhile, the numerous recesses and lands of the indented labyrinthine pattern 62 forming the third dust intrusion prohibiting section 62A are provided so as to be elongated in a direction intersecting the flow direction of dust and dirt intruded via the recording and/or reproducing aperture portion 24a formed in the main cartridge body unit 2. That is, the indented labyrinthine pattern 62 is provided for extending substantially parallel to the lateral edges of the recording and/or reproducing aperture portion 24a.

The assembling sequence of the above-described disc cartridge 1, according to the present invention, is as follows:

In assembling the disc cartridge 1, the upper shell 6 is placed with its inner surface directed upwards, as shown in FIG. 5. The chuck plate 40 is housed in the plate housing recess 41 of the upper shell 6, as the disc thrusting portion 40a is directed upwards. The disc thrusting portion 40a is fitted from the fitting opening 42a and, in this state, the plate retainer 42 is mounted in the plate housing recess 41 as with an adhesive. This causes the disc thrusting portion 40a of the chuck plate 40 to be protruded from the fitting opening 42a of the plate retainer 42, while causing the chuck plate 40 to be rotatably accommodated in the inner space defined by the plate housing recess 41 and the plate retainer 42.

The optical disc 3 is housed within the inner peripheral wall 11 forming the disc housing section of the upper shell 6.

The ring 43 of the inner shell 4 is engaged in the guide groove 13 of the upper shell 6 to overlie the optical disc 3. This rotatably accommodates the optical disc 3 in the disc housing section defined intermediate the upper shell 6 and the inner shell 4. It is noted that registration of the inner shell 4 relative to the upper shell 6 is to be achieved at the outset so that the aperture 44 of the inner shell 4 is in coincidence with the first and second pickup intrusion recesses 9, 12 of the upper shell 6.

The paired shutter members 5a and 5b are then mounted to the inner shell 4. Specifically, the engagement openings 50a, 50b are engaged by the supporting shafts 49a, 49b of the inner shell 4, as the abutment surfaces of the shutter members 5a and 5b face each other. This allows the paired shutter members 5a and 5b to be mounted for rotation about the supporting shafts 49a, 49b of the inner shell 4 as the center of rotation. It is noted that registration of the paired shutter members 5a and 5b with respect to the inner shell 4 is to be achieved at the outset so that the abutment surfaces of the paired shutter members 5a and 5b will lie along the side edge of the aperture 44 of the inner shell 4. Simultaneously as, before or after this position registration, the lock member 29 is mounted on the supporting shaft 25 of the lock housing section, while the tab member 30 is housed within the tab housing section.

The lower shell 7 then is superposed on the upper shell 6. As the peripheral wall sections 8, 21 of the upper and lower shells 6, 7 are abutted against each other, the positioning peripheral wall 22 of the lower shell 7 is engaged in the positioning recess 10 of the upper shell 6. The positioning pin 20 of the upper shell 6 is fitted to the positioning cap 28 of the lower shell 7. The dust-proofing peripheral wall 23, lower corner peripheral wall 26 and the lower tab peripheral wall 27 of the lower shell 7 are engaged in the first groove 16, second groove 17 and in the third groove 19 of the upper shell 6, respectively.

The guide pin 53 of the lower shell 7 is engaged in the elongated opening 54 in the shutter members 5a, 5b. It is noted that registration between the lower shell 7 and the paired shutter members 5a, 5b may be facilitated by previous position registration of the paired shutter members 5a, 5b with respect to the inner shell 6. A set screw, not shown, is threaded in the tapped hole of the positioning pin 20 through the through-hole of the positioning cap 28. This secures the lower shell 7 to the upper shell 6 to form the main cartridge body unit 2. At this time, the inner shell 4 and the paired shutter members 5a, 5b are in the open positions, such that a portion of the optical disc 3 is exposed to outside via the aperture 24 of the main cartridge body unit 2.

The gear 45 is acted on in this state to rotate the inner shell 4 in the opposite direction to cause the paired shutter members 5a, 5b to close the aperture 24 of the main cartridge body unit 2. The above completes the assembling operation of the disc cartridge 1. Thus, the disc cartridge 1 according to the present invention can be assembled extremely easily with a smaller number of components.

As means for securing the lower shell 7 to the upper shell 6, adhesives may be used for securing the upper and lower shells 6, 7 together, instead of using fastening means, such as st screws.

Figure 17:
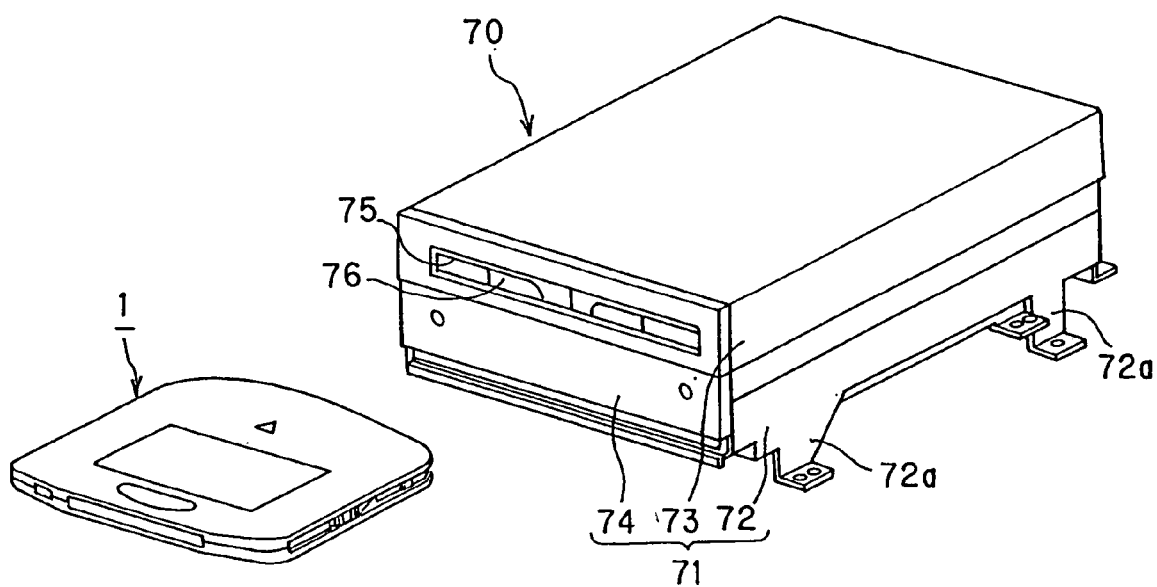
FIG. 17 is a perspective view showing a disc driving device used in a disc cartridge according to the present invention.

With the above-described disc cartridge 1, information signals can be recorded and/or reproduced for the optical disc 3 using a disc driving device 70 such as is shown in FIG. 17.

The disc driving device 70 includes an outer casing 71, formed by a hollow casing, and a main body unit, not shown, accommodated within the outer casing 71. This outer casing 71 includes a main casing unit 72 opened in the upper and front surfaces, a casing lid 73 removably mounted on an upper part of the main casing unit 72 for closing its upper side, and a front panel 74 removably mounted to a front side of the outer casing for closing the front side of the main casing unit 72 and the casing lid 73.

At four places of the main casing unit, there are provided legs 72a protruded downwards. It is by these legs 72a that the disc driving device 70 is supported. The front panel 74 is a horizontally elongated flat plate member, an upper portion of which includes a horizontally elongated cartridge inserting/ejecting opening 75. This cartridge inserting/ejecting opening 75 is of approximately the same size as the front surface of the disc cartridge 1. This cartridge inserting/ejecting opening 75 is kept closed by an opening/closure door 76 provided on an inner side.

In introducing the disc cartridge 1 into the disc driving device 70, the opening/closure door is pressed by the front surface side of the disc cartridge 1, until the disc cartridge 1 is inserted to a predetermined position, at which time the disc cartridge 1 is automatically gripped by a loading mechanism, not shown. The disc cartridge 1 is set on the chassis 1, with plural positioning recesses 38 being engaged by plural positioning pins, not shown, protuberantly formed on the chassis 1 within the disc driving device 70.

Simultaneously as, before or after this setting of the disc cartridge, the inner shell 4 is rotated in one direction, by a shutter opening/closing mechanism, provided within the disc driving device 70, so that the paired shutter members 5a, 5b open the aperture 24 of the main cartridge body unit 2.

Figure 18:
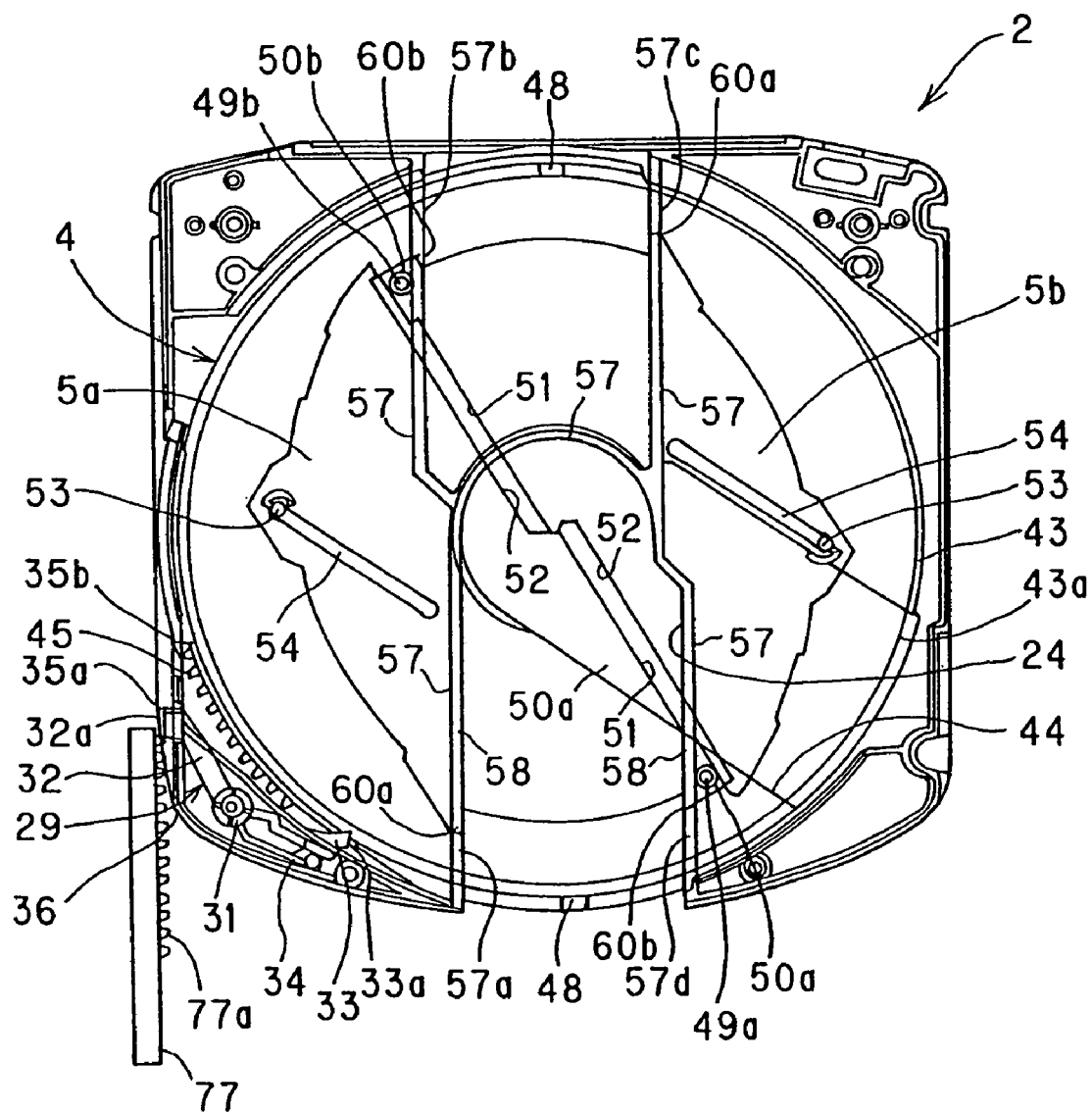
FIG. 18 is a see-through plan view for illustrating the opening/closure states of the aperture provided in the main cartridge body unit, and particularly showing the completely closed state of the aperture.

Specifically, when the disc cartridge 1 is inserted as far as a predetermined position from the cartridge inserting/ejecting opening 75, a rack rod 77 of the shutter opening/closure mechanism thrusts the operating lug 32a of the lock member 29 protruded from the lock opening 35a, as shown in FIG. 18. This unlocks the lock member 29 with respect to the inner shell 4. The rack rod 77 is further introduced into the opening for a rotor 35b to cause a gear 77a provided on the rack rod 77 to mesh with the gear 45 of the inner shell 4.

Since the aperture 44 of the inner shell 4 is inclined to the maximum extent with respect to the aperture 24 of the main cartridge body unit 2, the overlapped portions of the apertures 24, 44 are exposed, however, the overlapped aperture portions are closed by the paired shutter members 5a, 5b.

Figure 19:
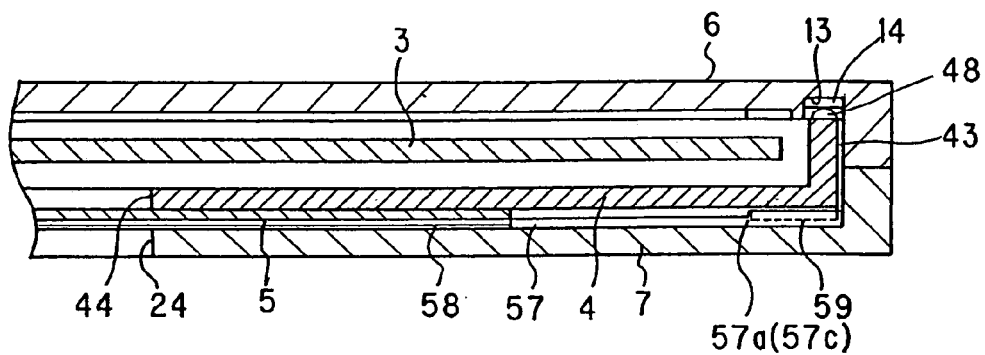
FIG. 19 is a schematic cross-sectional view for illustrating the opening/closure states of the aperture provided in the main cartridge body unit, and particularly showing the state in which a lift-up lug on the side inner shell rides over a lift-up lug on the side upper shell.

If then the rack rod 77 is intruded, as a result of the operation of introducing the disc cartridge, as shown in FIG. 19, the inner shell 4 is rotated in one direction, as a result of meshing of the gear 77a of the rack rod 77 with the gear 45 of the inner shell 4.

Figure 20:
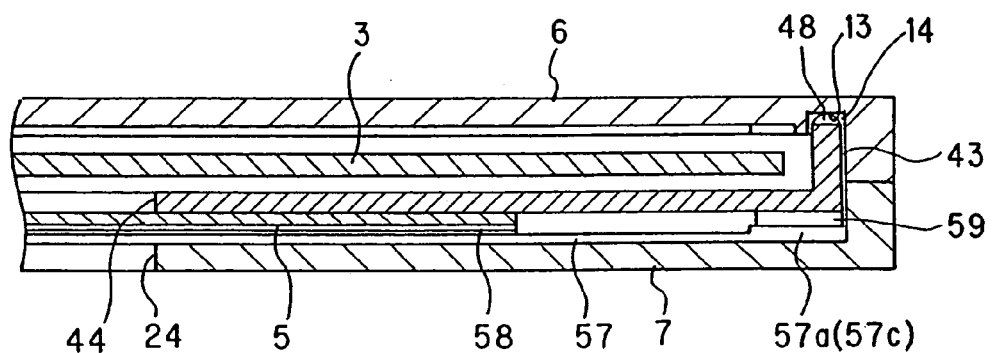
FIG. 20 is a schematic cross-sectional view for illustrating the opening/closure states of the aperture provided in the main cartridge body unit, and particularly showing the state in which the lift-up lug on the side inner shell and the lift-up lug on the side upper shell have become disengaged from each other.

In an initial state in which the inner shell 4 commences its rotation, the lift-up lugs 48 of the inner shell 4 ride over the lift-up lugs 14 of the guide groove 13, so that the shutter member 5 is clamped between the inner shell 4 and the lower shell 7. Thus, a larger force is required in causing rotation of the inner shell 4. Referring to FIG. 20, the inner shell 4 is rotated in one direction, against the force of friction produced by the riding of the lift-up lugs 14, 48 relative to each other. This disengages the lift-up lugs 14, 48 from each other to reduce the force of friction to permit the inner shell 4 to be rotated smoothly with only a small force.

By the inner shell 4 being rotated in one direction, the disengaging protrusions 59 ride on the raised portions 57a, 57c of the rib-like projection 57 to set up a state in which the inner shell 4 is raised relative to the lower shell 7. This raises the shutter members 5a, 5b towards the upper shell 6 to disengage the rib-like projection 57 from the groove-like recess 58.

Since the engagement openings 50a, 50b of the paired shutter members 5a, 5b are engaged with the supporting shafts 49a, 49b, the shutter members 5a, 5b are also rotated in one direction, as is the inner shell 4. On the other hand, since the guide pin 53 of the lower shell 7 is slidably engaged in the elongated openings 54 of the shutter members 5a, 5b, the guide pin 53 is relatively moved in the elongated opening 54 towards its inner peripheral end in keeping with rotation of the inner shell 4.

Figure 21:
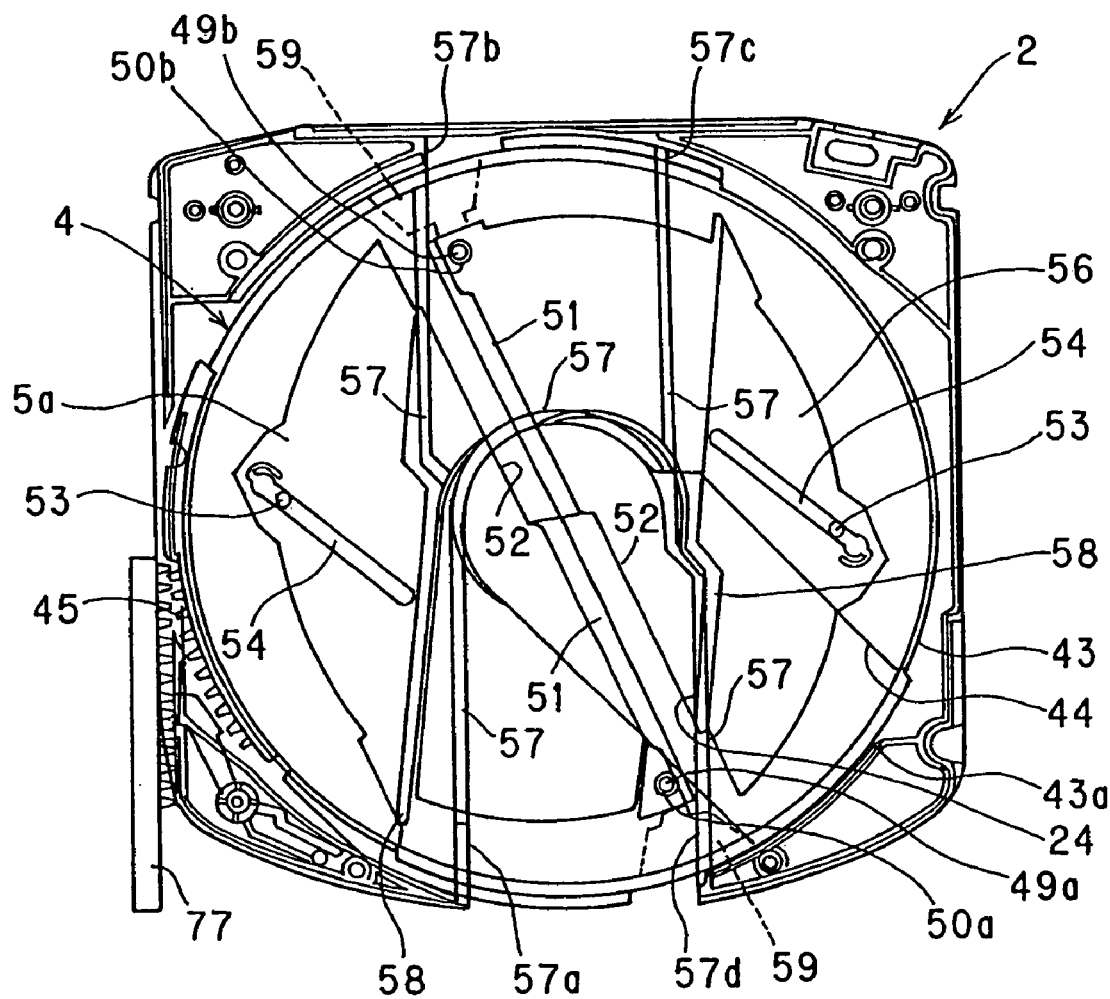
FIG. 21 is a see-through plan view for illustrating the opening/closure states of the aperture provided in the main cartridge body unit, and particularly showing the state in which the aperture has slightly been opened.
Figure 22:
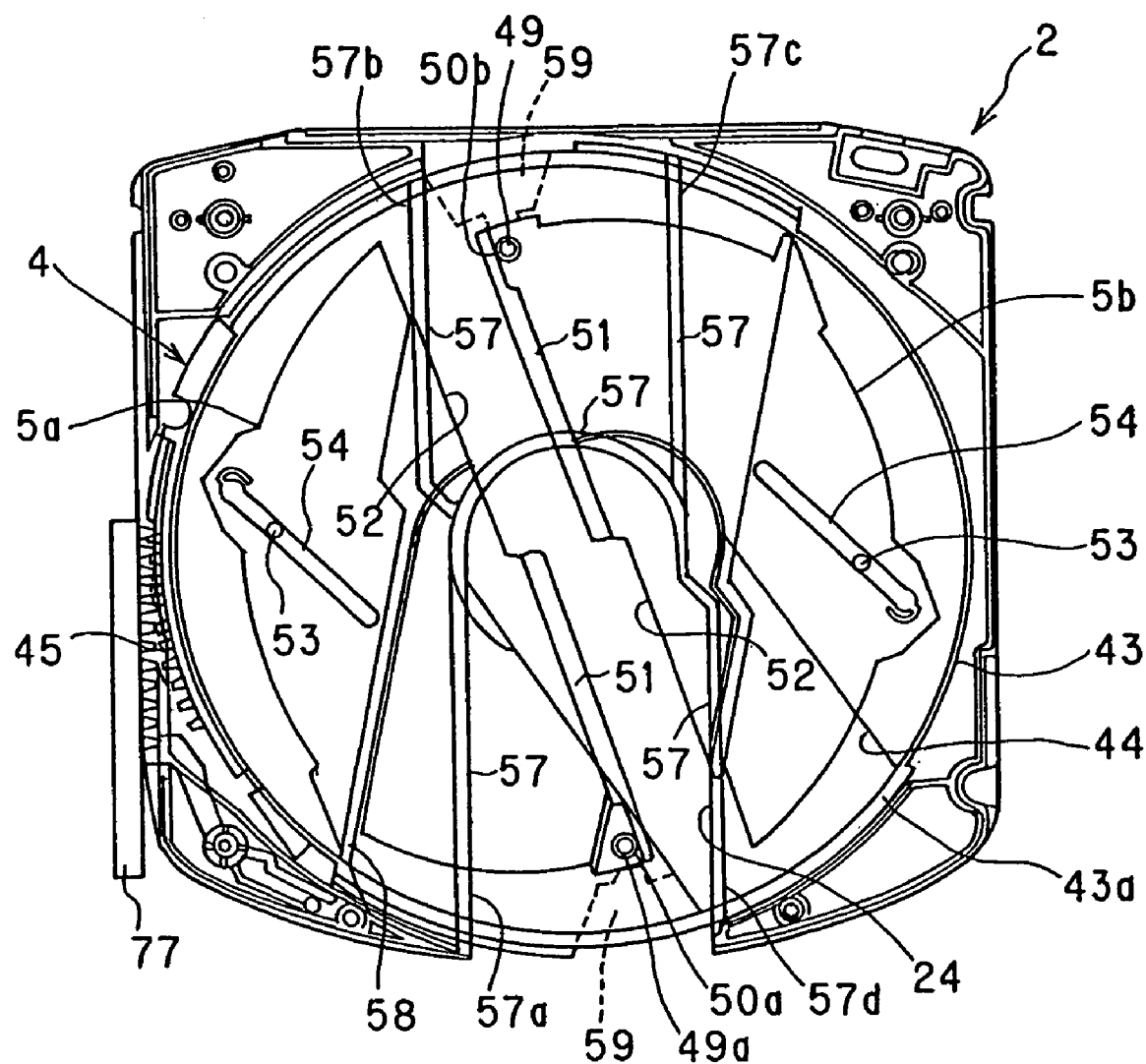
FIG. 22 is a see-through plan view for illustrating state in which the aperture has further slightly been opened.
Figure 23:
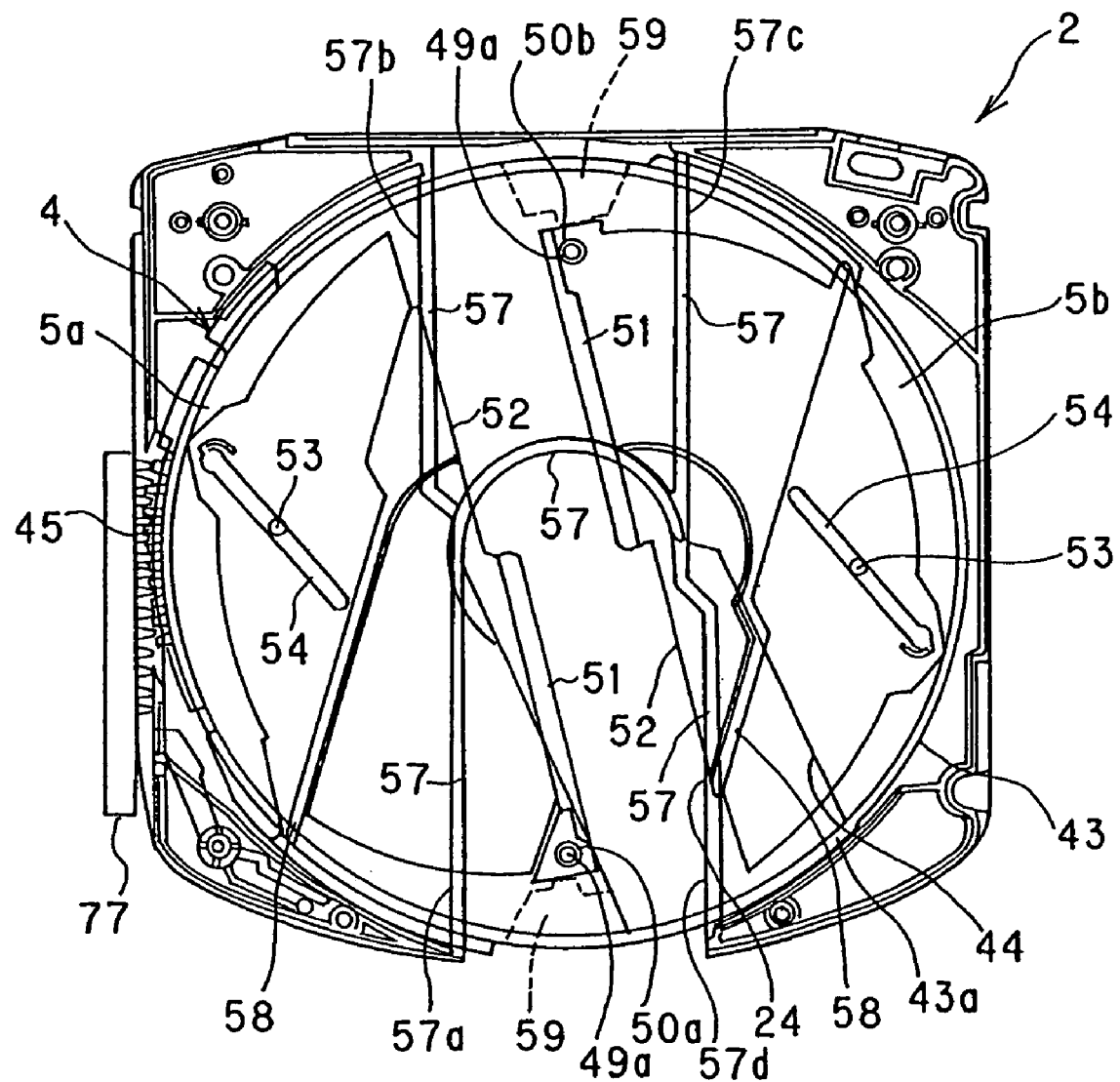
FIG. 23 is a see-through plan view for illustrating the state in which the aperture has additionally slightly been opened.
Figure 24:
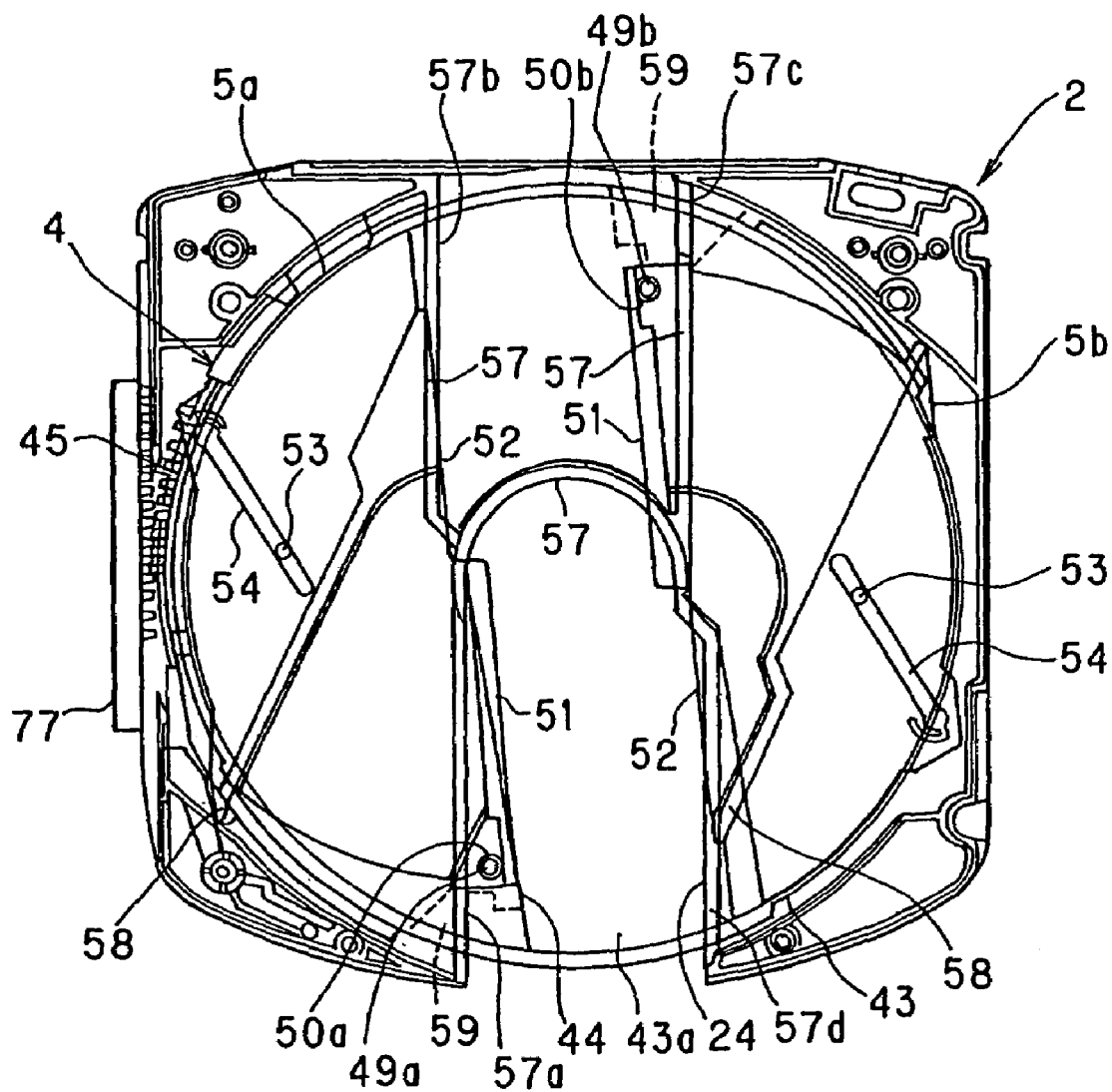
FIG. 24 is a see-through plan view for illustrating state in which the aperture has furthermore additionally slightly been opened.
Figure 25:
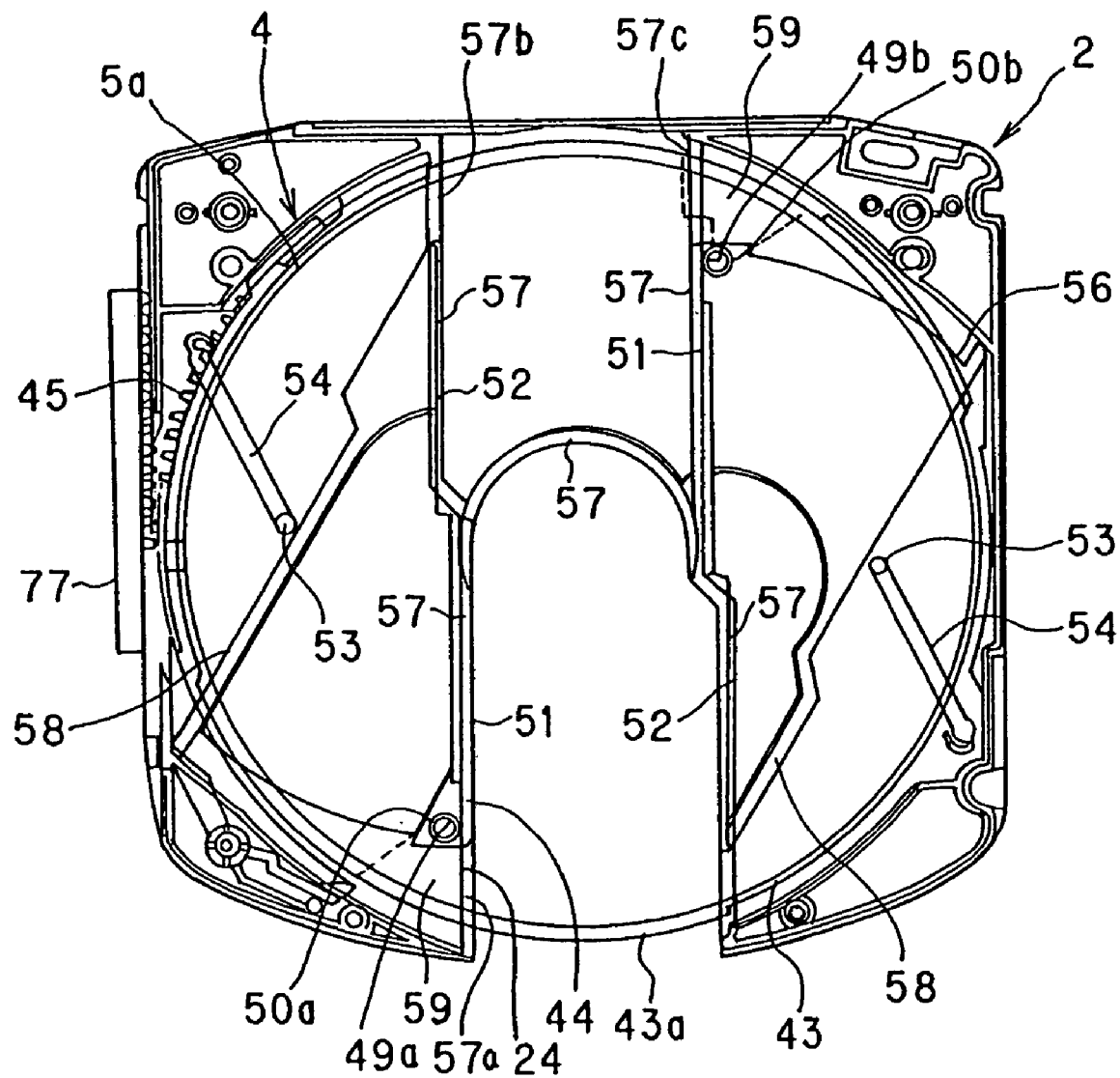
FIG. 25 is a see-through plan view for illustrating state in which the aperture provided in the main cartridge body unit has completely been opened.

Thus, the paired shutter members 5a, 5b are moved from the slightly opened state of FIG. 21, through the states shown in FIGS. 22, 23 and 24 to a position gradually opening the aperture 44 of the inner shell 4. When the inner shell 4 is rotated to a condition in which the aperture 44 of the inner shell 4 is approximately coincident with the aperture 24 of the main cartridge body unit 2, as shown in FIG. 25, the aperture 24 of the main cartridge body unit 2 is completely opened.

The disc driving device 70 is now in such a state in which the turntable 78 for rotationally driving the optical disc 3 and the optical head 79 for recording and/or reproducing information signals on or from the optical disc 3 may be inserted into the inside of the disc cartridge 1, as shown in FIG. 9.

That is, in the present disc driving device 70, when the turntable 78 is moved towards the disc cartridge 1 or when the disc cartridge is moved towards the turntable 78, a check magnet 78a of the turntable 78 is attracted towards the chuck plate 40, through the center opening 3a of the optical disc 3, so that the center portion of the optical disc 3 is clamped between the turntable 78 and the chuck plate 40. The optical disc 3 is now chucked in position on the turntable 78 and hence is run in rotation under the driving force of a spindle motor 80. The optical disc 3 is also chucked on the turntable 78 for setting the height-wise position thereof in the inside of the main cartridge body unit 3.

On the other hand, the optical head 79 is moved along the radius of the optical disc 3 so that at least a portion of the optical head 79 is intruded from outside the outer rim of the disc cartridge 1 through the apertures 24, 44 into the inside of the disc cartridge 1. Moreover, the optical head 79 faces a signal readout surface R, as the lower surface of the optical disc 3, with a preset separation within the disc cartridge 1.

Figure 26:
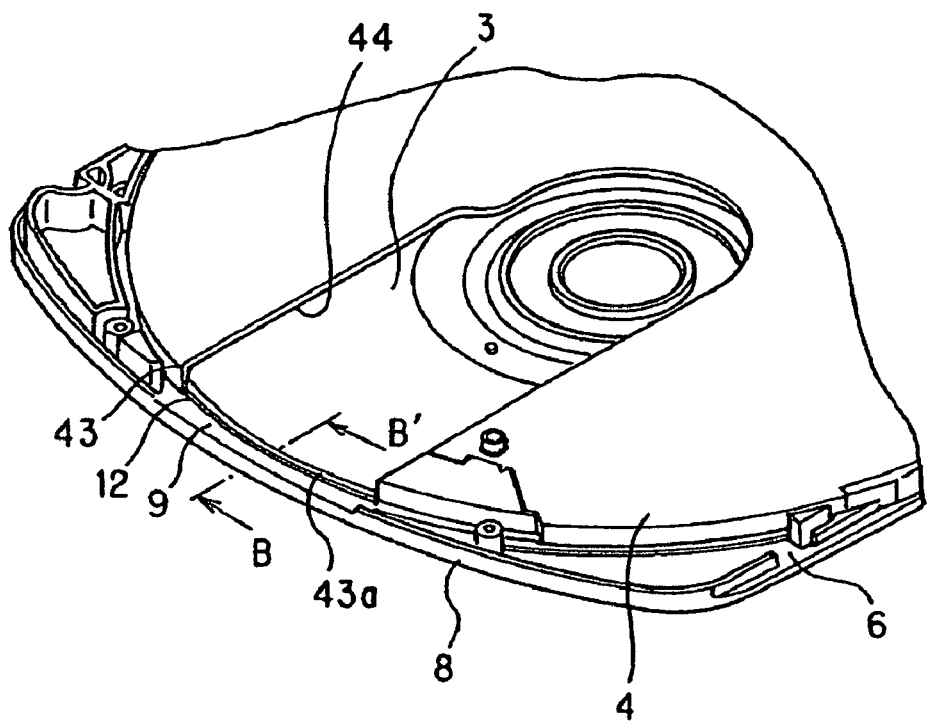
FIG. 26 is a schematic perspective view showing the opened position of the inner shell relative to the upper shell in a disc cartridge according to the present invention.
Figure 27:
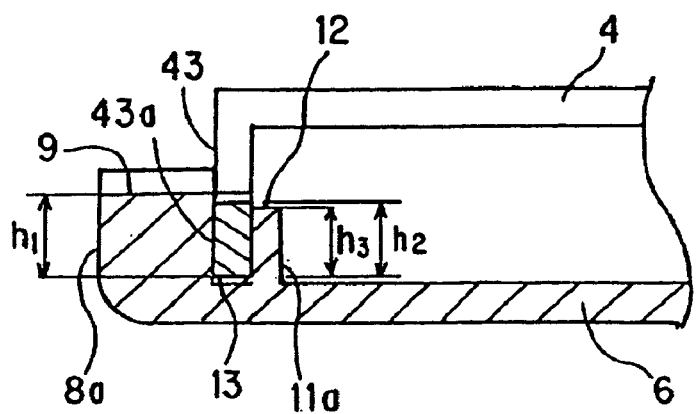
FIG. 27 is a cross-sectional view taken along line B–B' in FIG. 26.

It is noted that, with the disc cartridge 1, a connecting portion 43a operating for bridging the aperture 44 of the inner shell 4 is set to a height such that the connecting portion 43a is not protruded towards the lower shell 7 with respect to the signal readout surface R of the optical disc 3, as shown in FIGS. 26 and 27.

More specifically, the connecting portion 43a of the inner shell 4 is set so as to be flush with or lower in height than an outer peripheral wall 8a of the upper shell 6, exposed to outside via the aperture 24 of the main cartridge body unit 2. An inner peripheral wall 11a of the upper shell 6, exposed to outside via the aperture 24 of the main cartridge body unit 2, is set so as to be flush with or lower in height than the connecting portion 43a of the inner shell 4.

With the height $h_1$ of the outer peripheral wall 8a of the upper shell 6, exposed to outside through the aperture 24 of the main cartridge body unit 2, the height $h_2$ of the connecting portion 43a of the inner shell 4 and with the height $h_3$ of the inner peripheral wall 11a of the upper shell 6, exposed to outside through the aperture 24 of the main cartridge body unit 2, the relationship of $h_1 > h_2 > h_3$ is met.

In this case, if a minor offset caused by rotation is produced between the ring 43 of the inner shell 4 and the guide groove 13 of the upper shell 6, the optical head 79 may be optimally intruded into the inside of the disc cartridge 1 without the optical head 79 interfering with the connecting portion 43a of the inner shell 4. That is, with the present disc cartridge, the optical head 79, moved substantially horizontally, may be optimally intruded into the inside of the disc cartridge 1 from outside the outer rim of the disc cartridge 1 through the apertures 24, 44.

Consequently, with the disc cartridge 1, the position relationship between the optical disc 3 and the optical head 79 may be maintained optimally to assure high operational reliability in a manner free from possible damages to the optical head 79.

When the disc cartridge 1 according to the present invention is loaded in the cartridge loading position in the disc driving device 70, the optical disc 3, housed within the main cartridge body unit 2, is loaded on the turntable 78. By the chuck plate 40 being attracted by a magnet, not shown, provided on the turntable 78, so as to be clamped between the turntable 78 and the chuck plate 40, the optical disc 3 may be rotated in unison with the turntable 78. When the spindle motor is run in rotation, the optical disc is run in rotation, as one with the turntable 78, at a constant linear velocity. At this time, the shutter members 5a, 5b are moved, such that the optical head 79 faces the optical disc 3 via the recording and/or reproducing aperture 24 now opened. By the optical head 79 being moved along the radius of the rotationally driven optical disc 3 and by the signal recording area of the optical disc 3 being scanned by the light beam radiated from the optical head 79, the information signals recorded on the optical disc 3 may be read out, or the information signals may be written on the optical disc 3.

In discharging the disc cartridge 1 from the disc driving device 70, an eject button, not shown, provided on e.g. the front panel 74, is acted on, whereby the loading mechanism performs the ejecting operation to move the disc cartridge 1 towards the cartridge inserting/ejecting opening 75 to cause relative receding movement of the rack rod 77. By the rack rod 77 performing a receding movement, the operation which is the reverse of that in inserting the disc as described above occurs, that is, the inner shell 4 is rotated in the opposite direction, with the paired shutter members 5a, 5b closing the aperture 24 of the inner shell 4.

Specifically, the shutter members 5a, 5b are gradually moved in the reverse direction from the completely opened state shown in FIG. 25, through the states shown in FIGS. 23, 22 and 21, in this order, up to a position of completely closing the aperture 44 of the inner shell 4. At this time, the lift-up lugs 48 of the inner shell 4 is not engaged with the lift-up lugs 14 of the lower shell 7, such that the inner shell 4 may be rotated smoothly with only a small force.

When the inner shell 4 is rotated to a state in which the aperture 44 of the inner shell 4 is tilted to the maximum extent with respect to the aperture 24 of the inner shell 4, the aperture 24 of the main cartridge body unit 2 is closed completely.

Since the lift-up lugs 48 of the inner shell 4 ride on the lift-up lugs 14 of the lower shell 7, a relatively large force is required for subsequent rotation of the inner shell 4, because of the resistance offered by the force of friction.

With rotation of the inner shell 4, the guide pin 53 performs relative movement in the inside of the elongated opening 54 towards the outer peripheral end. The elastic force is produced in the elastic piece 56 by the guide pin 53 contacting and thrusting the elastic piece 56. By this elastic force, the abutment surfaces of the paired shutter members 5a, 5b compress against each other, thus improving the hermetic sealing.

Moreover, with the present disc cartridge 1, the first abutment surface section 51 of the shutter member 5a is engaged with the second abutment surface section 52 of the other shutter member 5b, while the first abutment surface section 51 of the shutter member 5b is engaged with the second abutment surface section 52 of the other shutter member 5a.

In this case, since the abutment surfaces of the shutter members 5a, 5b are optimally superposed together, the so-called labyrinth effect is produced, thus preventing dust and dirt from being intruded via a space between the paired shutter members 5a, 5b. That is, the dust intrusion prohibiting section is formed. In this case, since the abutment surfaces of the shutter members 5a, 5b are optimally superposed together, it is possible to prevent the paired shutter members 5a, 5b from being deformed.

The rack rod 77 then is receded further to disengage the gear 77a of the rack rod 77 from the gear 45 of the inner shell 4. The operating projection 32a of the lock member 29 then is projected from the lock opening 35a so that the stopper boss 33a of the stopper piece 33 is engaged with the gear 45 of the inner shell 4. This halts rotation of the inner shell 4 in the disc cartridge 1 to set up a so-called lock condition so that the state of closure of the apertures 24, 44 by the shutter members 5a, 5b may be reliably maintained and hence the inadvertent opening operation of the shutter members 5a, 5b by the user may be prevented positively.

Moreover, in the present disc cartridge, since the lift-up lugs 48 of the inner shell 4 ride on the lift-up lugs 14 of the lower shell 7, the apertures 24, 44 may be maintained in the fully closed state under the own weight of the shutter members 5a, 5b and the force of friction produced between the inner shell 4 and the lower shell 7.

With the present disc driving device 70, the opening/closure door 76 opens the cartridge inserting/ejecting opening 75 to permit the disc cartridge 1 to be automatically ejected by the loading mechanism via the opened cartridge inserting/ejecting opening 75.

Figure 28:
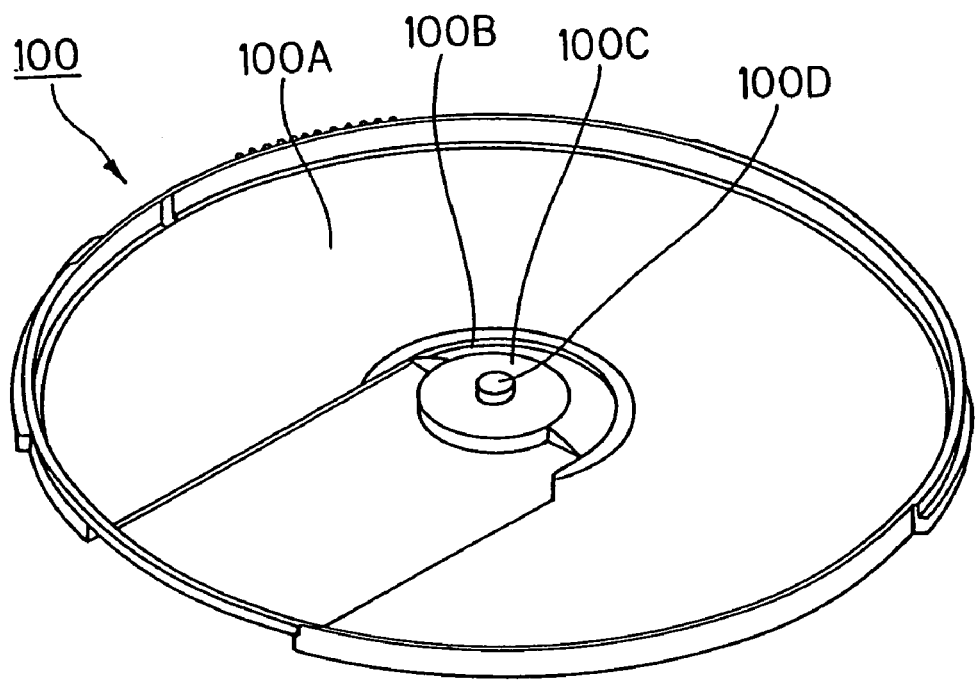
FIG. 28 is a perspective view showing a cast resin component, forming the inner shell, looking from the side upper surface.
Figure 29:
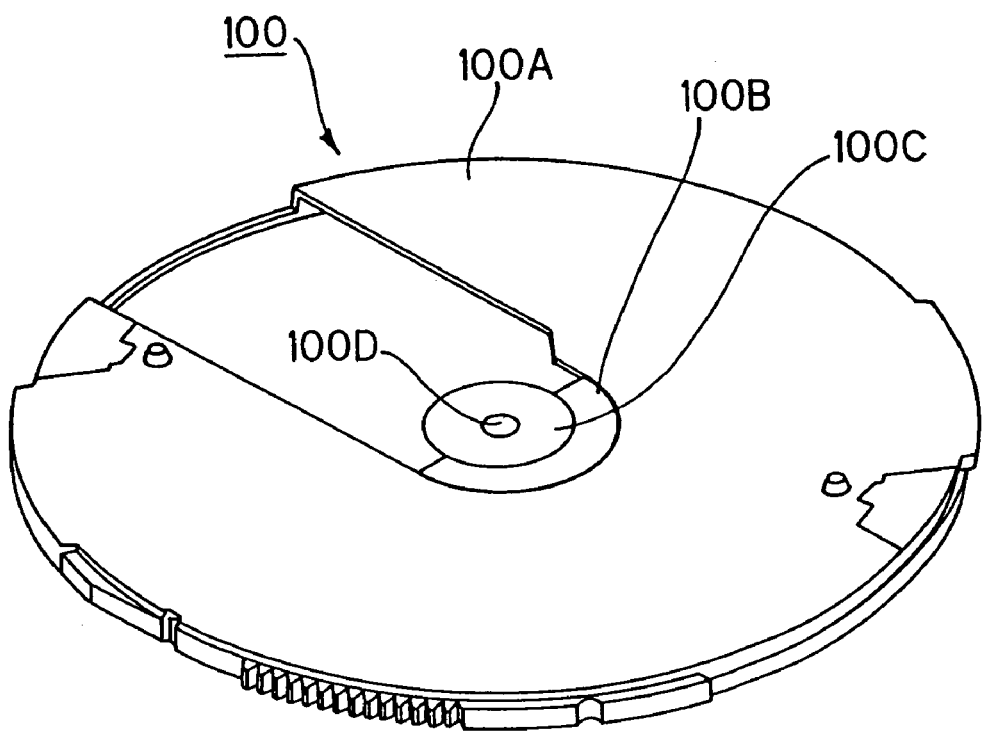
FIG. 29 is a perspective view similar to FIG. 28 but looking from the lower surface side.

Meanwhile, the inner shell 4, forming the disc cartridge 1 according to the present invention, is formed using a resin molded product 100, formed as shown in FIGS. 28 and 29. The resin molded product 100 includes a first molded portion 100A and a second resin molded portion 100C formed centrally of and as one with the first molded portion 100A through a flanged thin-walled portion 100B, as shown in FIGS. 28 and 29. The second resin molded portion 100C includes a trace 100D of a resin injecting port or gate used at the time of molding.

Figure 30:
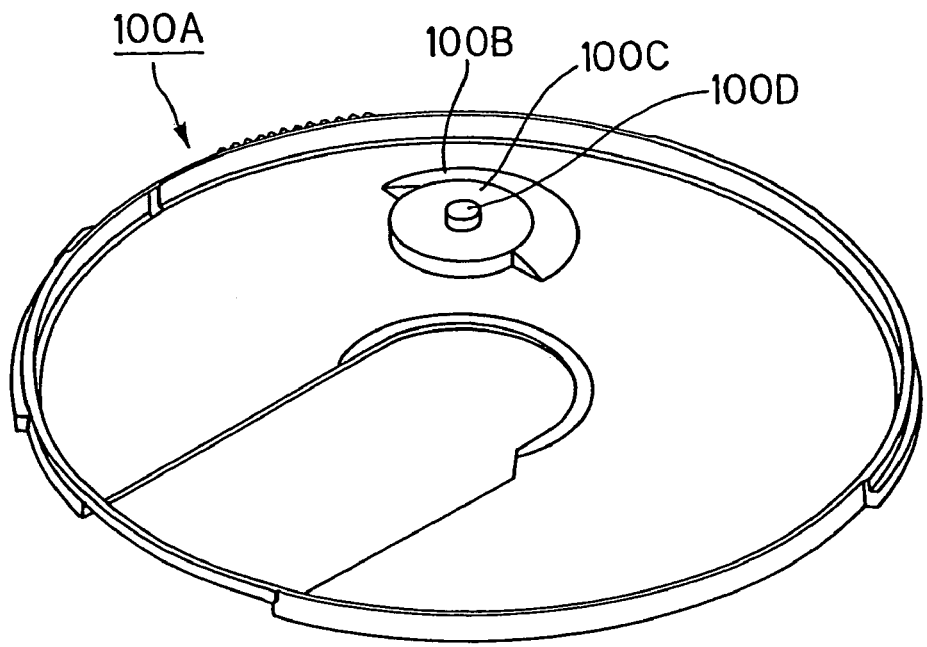
FIG. 30 is a perspective view showing the state in which a first cast component has been separated from the resin casting mass, looking from the side upper surface.
Figure 31:
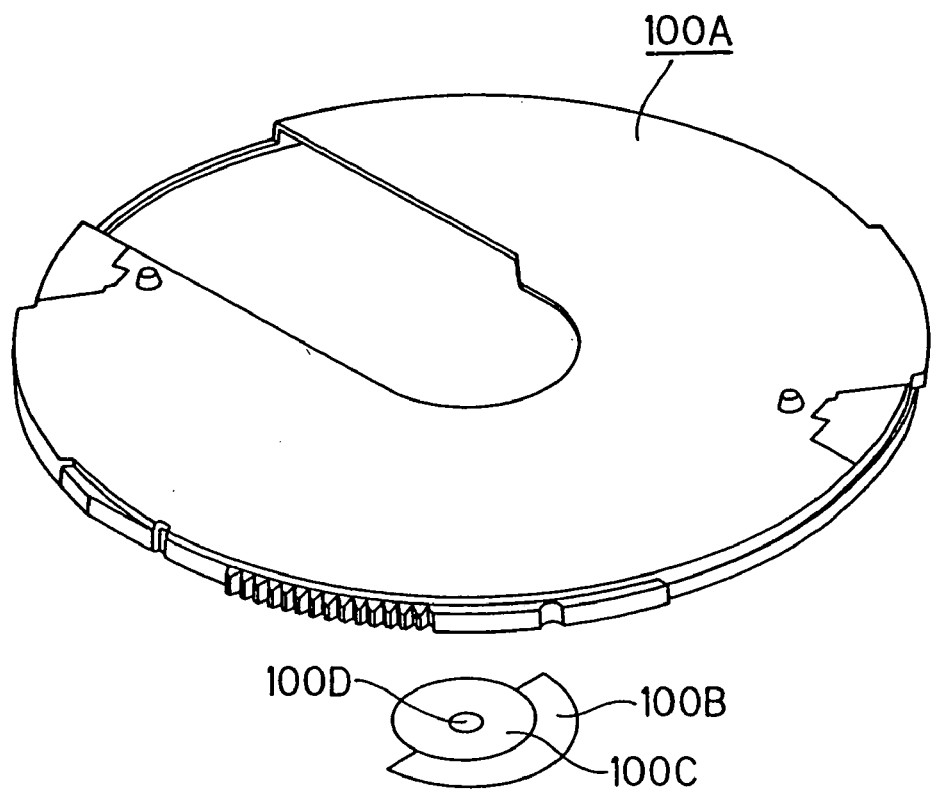
FIG. 31 is a perspective view similar to FIG. 29 but looking from the side lower surface.

After the flanged thin-walled portion 100B is cut off and the second resin molded portion 100C is removed, the first molded portion 100A is assembled into the disc cartridge 1 to form the inner shell 4, as shown in FIGS. 30 and 31.

The second resin molded portion 100C, provided with a resin injection port of the resin molded product 100, is provided, along with the flanged thin-walled portion 100B, at a position of the second resin molded portion in register with the aperture 44 of the inner shell 4. That is, by severing the second resin molded portion 100C along with the flanged thin-walled portion 100B from the resin molded product 100, the first molded portion 100A forms the inner shell 4 provided with the aperture 44.

Figure 32:
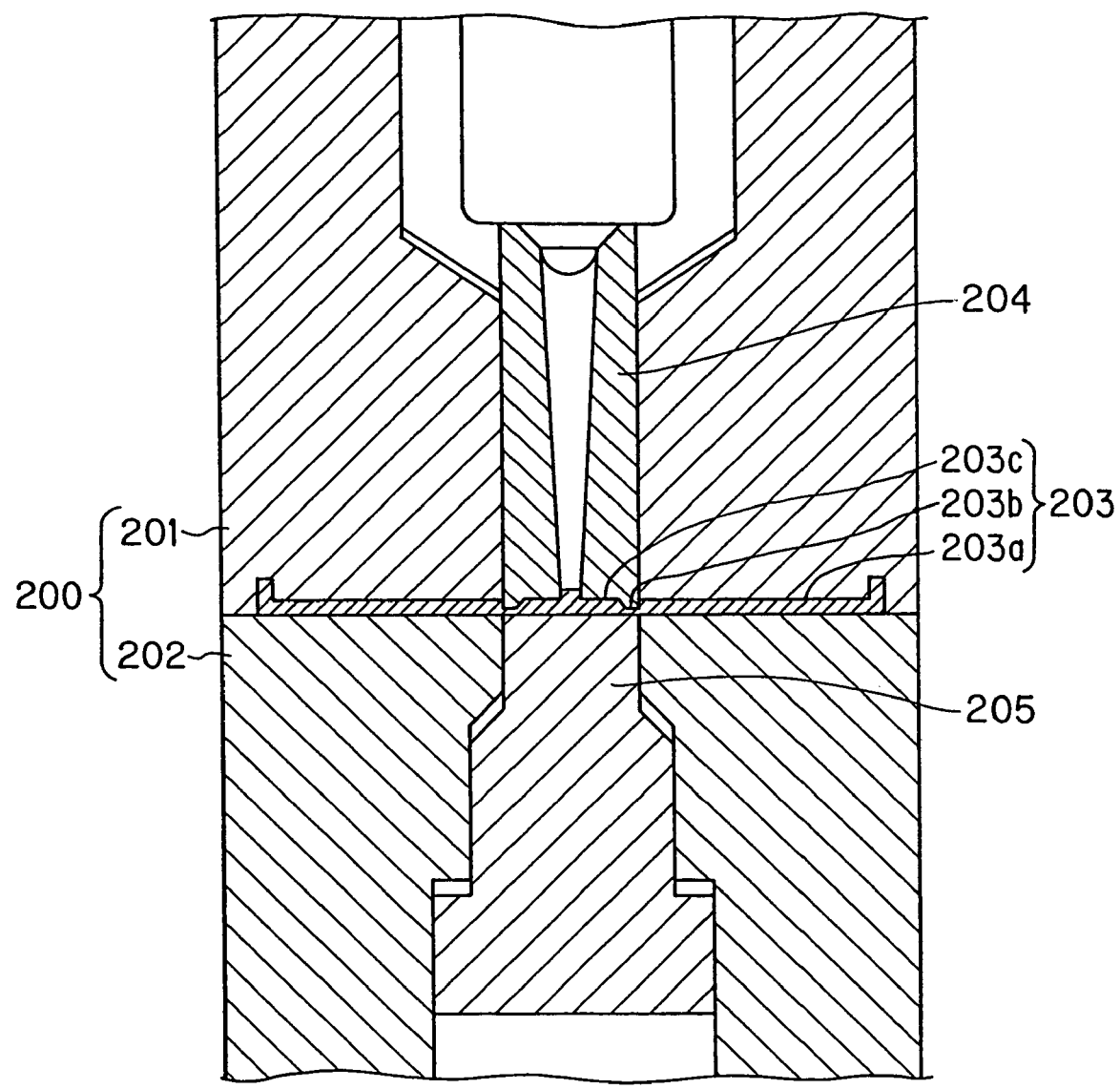
FIG. 32 is a cross-sectional view showing a resin casting device for casting the resin cast mass.

The resin molded product 100, which is to form the inner shell 4, is manufactured by using an injection molding device 200, shown in FIG. 32. This injection molding device 200 includes a fixed metal die 201 and a movable metal die 202. Between the fixed metal die 201 and the movable metal die 202, there is formed a cavity 203, as a mold cavity, for forming the resin molded product 100. The cavity 203 includes a first cavity portion 203a for forming the first molded portion 100A, a second cavity portion 203b for forming the flanged thin-walled portion 100B and a third cavity portion 203c for forming the second resin molded portion 100C.

The fixed metal die 201 includes a gate bush 204, as a resin injection port, at a position thereof in register with the mid portion of the third cavity portion 203c. The second cavity portion 203b is a semi-circular film gate. The movable metal die 202 is provided with a gate cutting punch 205.

In the present injection molding device 200, when the molten resin is injected into the cavity 203 through the gate bush 204, the molten resin is diffused radially, about the gate 204 as center, so as to be injected into the third cavity portion 203c and into the first cavity portion 203a. By injecting the molten resin into the third cavity portion 203c and into the first cavity portion 203a, and by maintaining a preset pressure between the fixed metal die 201 and the movable metal die 202, the molten resin is charged even into niches of the third cavity portion 203c and into the first cavity portion 203a, for forming the resin molded product 100 comprised of the first to third molded portions.

When the resin molded product 100 has reached a temperature not higher than a preset temperature, before the resin molded product 100 is cooled and solidified in the cavity 203, the flanged thin-walled portion 100B is severed, using the gate cutting, punch 205. The movable metal die 202 then is moved in a direction away from the fixed metal die 201. The first and second molded portions 100A and 100C, severed at the flanged thin-walled portion 100B, are taken out from the injection molding device 200.

Figure 33:
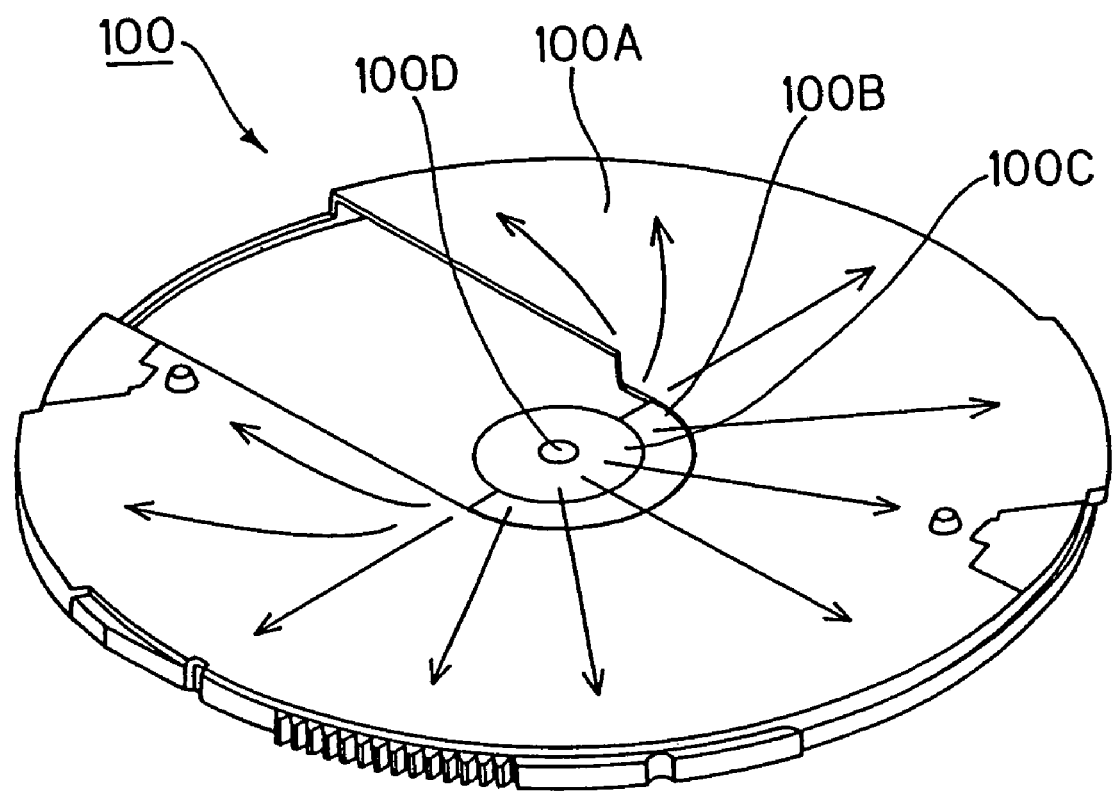
FIG. 33 is a perspective view showing the resin cast mass for illustrating the flow of molten resin.
Figure 34:
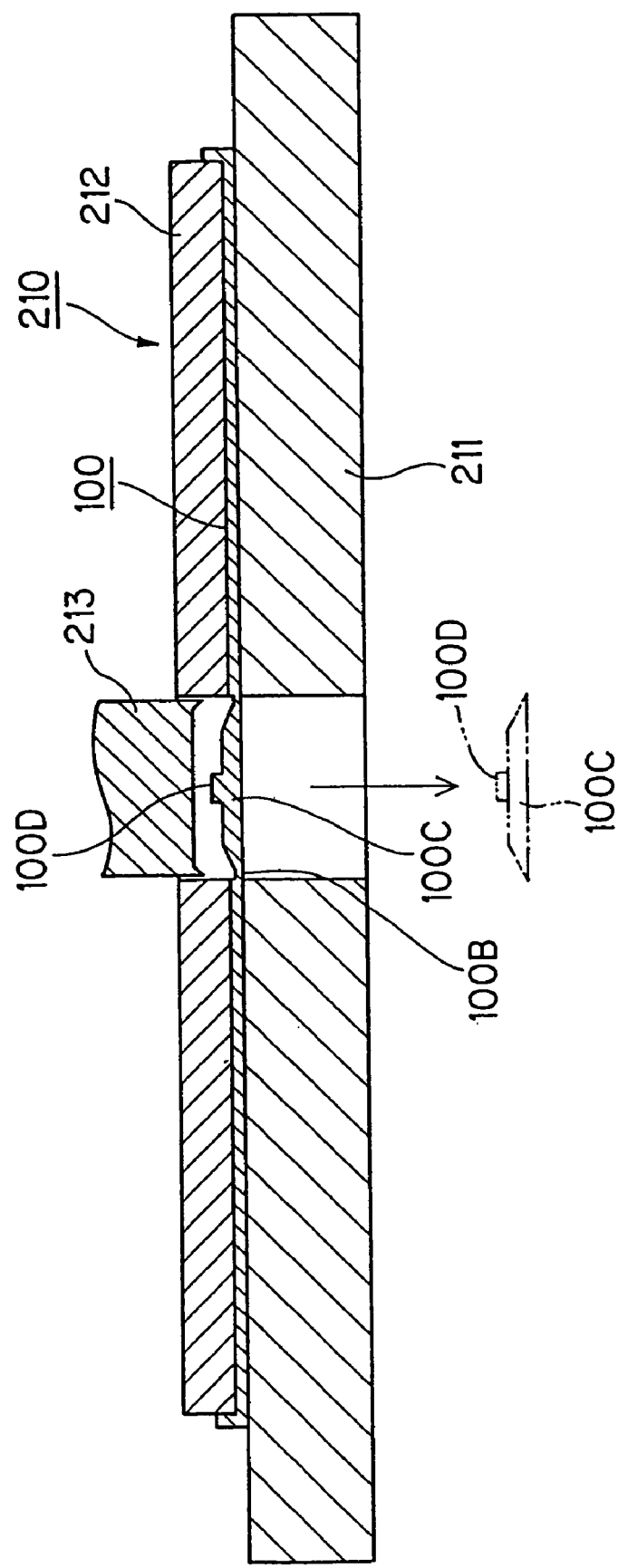
FIG. 34 is a perspective view showing a gate cut punch device for separating the first cast product from the resin cast mass.

In case the resin molded product 100 is molded using the injection molding device not provided with the gate cutting punch 205, the resin molded product 100 molded by the injection molding device is set on a lower jig 211 of a gate cutting device 210 and is retained by an upper jig 212 to sever the flanged thin-walled portion 100B by a gate cutting punch 213, as shown in FIG. 33.

The inner shell 4, manufactured by the method of the present invention, is formed from the resin molded product 100, by removing the second resin molded portion 100C, inclusive of a portion destined to be a resin injection port at the time of casting, and using only the first molded portion 100A not having the trace of the gate 100D, so that the inner shell may be manufactured to a high molding accuracy. Moreover, since there is no risk of producing micro-sized projections ascribable to the gate trace 100D on the outer peripheral surface, the inner shell 4 may be mounted within the main cartridge body unit 2 as smooth rotation thereof in the main cartridge body unit 2 is guaranteed.

In the manufacture of the inner shell 4 according to the present invention, the first molded portion 100A, forming the inner shell 4, may be separated from the second molded portion by severing the flanged thin-walled portion 100B interconnecting the first molded portion 100A and the second resin molded portion 100C, so that manufacture may be facilitated. Moreover, since the cutting of the flanged thin-walled portion 100B is achieved in the metal die by a punch provided to the metal die of the injection molding device used for casting the resin molded product 100 forming the inner shell 4, the manufacture is again facilitated.

Although the foregoing description is made for a case of a disc cartridge employing an optical disc as an information recording medium, the present invention may also be applied to a magnetic disc, such as a magneto-optical disc or a floppy disc, and to a variety of other disc-shaped recording mediums. Although the foregoing description is made for a case in which the information recording and/or reproducing apparatus is a disc recording and/or reproducing apparatus, the present invention may, of course, be applied to a disc recording apparatus or a disc reproducing apparatus, that is an apparatus enabling only one of the recording and the reproducing operations.

Although the foregoing description is made for a case in which the aperture 24 is provided in the lower shell 7 of the main cartridge body unit 2, it is also possible to provide an aperture similar to that formed in the upper shell 6 to permit the optical disc to be accessed simultaneously from both the upper and lower shells 6, 7. It is also possible to vary the shape of the apertures 24 to enable plural discs simultaneously.

INDUSTRIAL APPLICABILITY

With the disc cartridge of the present invention, provided with a dust intrusion prohibiting section for prohibiting intrusion of dust into the main cartridge body unit, a superior dust-proofing effect may be displayed such that even micro-sized dust may be prevented from being intruded into the main cartridge body unit accommodating the disc-shaped recording medium.

Moreover, since the disc cartridge of the present invention is able to prevent intrusion of dust and dirt into the main cartridge body unit, while the interconnecting portion of the inner shell is of such a height that it is not protruded towards the lower shell with respect to the lower surface of the disc-shaped recording medium, so that the recording and/or reproducing-head may be satisfactorily introduced into the inside of the main cartridge body unit, without interfering with the connecting portion of the inner shell, as the recording and/or reproducing head is approached towards the disc-shaped recording medium, thus achieving the reduced size of the disc cartridge.

In addition, since the inner shell housed in the main cartridge body unit of the disc cartridge according to the present invention can be molded to a high accuracy, a superior dust-proofing effect may be displayed, such that even micro-sized dust may be prevented from being intruded into the main cartridge body unit, while the recording and/or reproducing aperture provided in the main cartridge body unit can be opened or closed smoothly.

The invention claimed is:

1. A method for producing an inner shell used for a disc cartridge, said disc cartridge including a disc-shaped recording medium having an inner rim and an outer rim, a main cartridge body unit including an upper shell and a lower shell having peripheral wall sections which abut against each other, said main cartridge body unit accommodating said disc-shaped recording medium for rotation therein, at least a portion of the peripheral wall section of said lower shell being opened to form an open end, with an aperture being formed in said main cartridge body unit beginning from said open end for exposing a portion of said disc-shaped recording medium to outside across the inner rim and the outer rim of the disc-shaped recording medium, the inner shell engaged in a guide groove formed between an outer peripheral wall section and an inner peripheral wall section of said upper shell so as to be supported for rotation therein, said inner shell including a connecting portion engaged in said guide groove, said inner shell also including an aperture in register with said aperture in said main cartridge body unit, and a shutter member movable by rotation of said inner shell between a position closing said aperture in said main cartridge body unit and a position opening said aperture in said main cartridge body unit, said inner shell including a first molded portion, provided with a recording and/or reproducing aperture, a second molded portion having a resin injection port and molded at a position where said recording and/or reproducing aperture is formed, and a flanged thin-walled section connecting said first and second molded portions as one to each other;

the method comprising the steps of:

injecting molten resin into a cavity defined by a fixed metal die and a movable metal die for molding said first molded portion, second molded portion and said flanged thin-walled section; and severing said flanged thin-walled section by a punch provided to said movable metal die before the molten resin injected into said cavity is cooled and solidified.

* * * * *